United States Patent
Porecki et al.

(10) Patent No.: US 10,685,460 B2
(45) Date of Patent: Jun. 16, 2020

(54) METHOD AND APPARATUS FOR GENERATING PHOTO-STORY BASED ON VISUAL CONTEXT ANALYSIS OF DIGITAL CONTENT

(71) Applicant: SAMSUNG ELECTRONICS CO., LTD., Suwon-si (KR)

(72) Inventors: Adam Porecki, Warsaw (PL); Andrzej Ruta, Warsaw (PL); Juliusz Labecki, Warsaw (PL); Michal Kudelski, Warsaw (PL); Tomasz Rudny, Poznan (PL); Jakub Tkaczuk, Rumia (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 68 days.

(21) Appl. No.: 14/994,684

(22) Filed: Jan. 13, 2016

(65) Prior Publication Data
US 2016/0203386 A1    Jul. 14, 2016

(30) Foreign Application Priority Data

Jan. 13, 2015    (KR) .................. 10-2015-0006113

(51) Int. Cl.
  *G06K 9/62*    (2006.01)
  *G06T 11/00*    (2006.01)
  *G06K 9/00*    (2006.01)

(52) U.S. Cl.
  CPC .......... *G06T 11/00* (2013.01); *G06K 9/00677* (2013.01)

(58) Field of Classification Search
  CPC .............. G06F 17/212; G06K 9/00288; G06K 9/00456; G06K 9/6253; G06T 11/60; G06T 9/002; G06T 7/74; G06N 7/005
  See application file for complete search history.

(56) References Cited

U.S. PATENT DOCUMENTS

| | | | |
|---|---|---|---|
| 8,013,874 B2 | 9/2011 | Reid et al. | |
| 8,229,931 B2 | 7/2012 | Rothmuller et al. | |
| 8,345,934 B2 | 1/2013 | Obrador et al. | |
| 2008/0306921 A1* | 12/2008 | Rothmuller | G06F 17/30038 |
| 2012/0014560 A1* | 1/2012 | Obrador | G06K 9/00677 |
| | | | 382/103 |
| 2013/0273968 A1* | 10/2013 | Rhoads | G06F 17/30244 |
| | | | 455/556.1 |
| 2014/0198986 A1* | 7/2014 | Marchesotti | G06F 17/30274 |
| | | | 382/190 |
| 2014/0289323 A1* | 9/2014 | Kutaragi | G06Q 50/01 |
| | | | 709/203 |
| 2015/0220537 A1* | 8/2015 | Cosgrove | G06F 17/3005 |
| | | | 707/693 |

(Continued)

OTHER PUBLICATIONS

Obrador et al., Supporting Personal Photo Storytelling for Social Albums, 2010, MM'10, Oct. 25-29, pp. 561-570, AAPA via IDS.*

(Continued)

*Primary Examiner* — Guillermo M Rivera-Martinez
(74) *Attorney, Agent, or Firm* — Sughrue Mion, PLLC

(57) ABSTRACT

A method of generating a photo-story is provided. The method includes generating tags that indicate properties of a context of photo images; predicting, based on the generated tags, scenes indicated by the photo images; and generating, based on the predicted scenes, a photo-story including a combination of the predicted scenes.

27 Claims, 18 Drawing Sheets

(56) References Cited

U.S. PATENT DOCUMENTS

2016/0139761 A1* 5/2016 Grosz .................. G06F 3/1243
715/769
2016/0188592 A1* 6/2016 Fergus .............. G06F 17/30038
707/738
2017/0193685 A1* 7/2017 Imbruce ................. G06T 13/80

OTHER PUBLICATIONS

Ngo et al., Video Summarization and Scene Detection by Graph Modeling, 2005, IEEE Transactions on Circuits and Systems for Video Technology, vol. 15, No. 2, pp. 296-305.*
Hanjalic et al., An Integrated Scheme for Automated Video Abstraction Based on Unsupervised Cluster-Validity Analysis, 1999, IEEE Transactions on Circuits and Systems for Video Technology, vol. 9, No. 8, pp. 1280-1289.*
Simon et al., "Scene Summarization for Online Image Collections", ICCV, University of Washington, vol. 7, 2007, 8 total pages.
Cooper et al., "Temporal Event Clustering for Digital Photo Collections", Proceedings of the 11th ACM International Conference on Multimedia, ACM, 2005, 10 total pages.
Ordonez et al., "Image Mining: A New Approach for Data Mining", CC Technical Report, University of Georgia, Feb. 20, 1998, 22 total pages.
Reddy et al., "Image Browsing, Processing, and Clustering for Participatory Sensing: Lessons From a DietSense Prototype", Proceedings of the 4th workshop on Embedded network sensors, 2007, 5 total pages.
Balabanovic et al., "Storytelling with Digital Photographs", Proceedings of the SIGCHI Conference on Human Factors in Computing Systems, Apr. 2000, 8 total pages.
Obrador et al., "Supporting Personal Photo Storytelling for Social Albums", ACM MM' 10, Oct. 25-29, 2010, 10 total pages.
"Google+ Auto Awesome", retrieved from <https://plus.google.com/photos/takeatour#photos/takeatour>, 6 total pages.
"HTC Zoe camera mode", retrieved from <https://play.google.com/store/apps/details?id=com.htc.zero>, 6 total pages.
D'Onfro, "Here's How to Check Out Your 20 Biggest Moments of 2013 on Facebook", Business Insider, Dec. 9, 2013, Facebook "Year in Review", retrieved from <https://www.facebook.com/yearinreview>, 1 total page.

* cited by examiner

METHOD AND APPARATUS FOR GENERATING PHOTO-STORY BASED ON VISUAL CONTEXT ANALYSIS OF DIGITAL CONTENT

CROSS-REFERENCE TO RELATED APPLICATION

This application claims priority from Korean Patent Application No. 10-2015-0006113, filed on Jan. 13, 2015 in the Korean Intellectual Property Office, the disclosure of which is incorporated by reference herein in its entirety.

BACKGROUND

1. Field

Methods and apparatuses consistent with exemplary embodiments relate to generating a photo-story by selecting highlights from a multitude of videos or photo images and providing the photo-story to a user.

2. Description of the Related Art

Due to the development of memory device technology and various personal devices (e.g., smartphones and tablet computers) for obtaining and generating digital data, the amount of media data created and stored by users is rapidly increasing.

Therefore, a photo-story service has been provided to sample and show some of a multitude of photo images and a large amount of video data.

SUMMARY

One or more exemplary embodiments provide a technology for generating a photo-story by selecting highlights from a multitude of videos or photo images and providing the photo-story to a user.

Additional aspects will be set forth in part in the description which follows and, in part, will be apparent from the description, or may be learned by practice of the presented exemplary embodiments.

According to an aspect of an exemplary embodiment, there is provided a method of generating a photo-story, the method including generating tags that indicate properties of a context of each of a plurality of photo images; predicting, based on the generated tags, scenes indicated by the photo images; and generating, based on the predicted scenes, at least one photo-story including a combination of the predicted scenes.

The generating of the tags may include detecting objects in the photo images by using visual pattern recognition models that are learned from training images; and determining, based on the detected objects, the properties of the context of each of the plurality of photo images.

The generating the at least one photo-story may include detecting candidate templates that include the predicted scenes, from among a plurality of templates that define a structure of the at least one photo-story; evaluating a matching degree between each of the candidate templates and photo images in the predicted scenes; selecting, based on a result of the evaluating, at least one of the candidate templates as a final template; and generating, based on the selected final template, the at least one photo-story to be provided to a user.

The plurality of templates may be preset or automatically generated by using the plurality of photo images and unsupervised machine learning.

The method may further include detecting, from among the plurality of photo images, overlapping images that are determined as identical or similar images according to a criterion, wherein the generating the at least one photo-story includes selecting, when the detected overlapping images correspond to an identical photo-story, one of the overlapping images as an image to be used in the identical photo-story.

The creating the at least one photo-story may include downloading at least one image used in a scene of the final template from the Internet.

The method may further include collecting the plurality of photo images from at least one of a user terminal, a multimedia content sharing service server, and a social network service server.

According to an aspect of another exemplary embodiment, there is provided an apparatus for generating a photo-story, the apparatus including a tag generator configured to generate tags that indicate properties of a context of each of a plurality of photo images; a scene predictor configured to predict, based on the generated tags, scenes indicated by the photo images; and a photo-story generator configured to generate, based on the predicted scenes, at least one photo-story including a combination of the predicted scenes.

The tag generator may include an object detector configured to detect objects in the photo images by using visual pattern recognition models that are learned from training images; and a properties determiner configured to determine, based on the detected objects, the properties of the context of each of the plurality of photo images.

The photo-story generator may include a template detector configured to detect candidate templates that include the predicted scenes, from among a plurality of templates that define a structure of the at least one photo-story; an evaluator configured to evaluate a matching degree between the candidate templates and photo images in the predicted scenes; a selector configured to select, based on a result of the evaluation, at least one of the candidate templates as a final template; and a photo-story creator configured to create, based on the selected final template, the at least one photo-story to be provided to a user.

The plurality of templates may be preset or automatically generated by using the plurality of photo images and unsupervised machine learning.

The apparatus may further include a properties determiner configured to detect, from among the plurality of photo images, overlapping images that are determined as identical or similar images according to a criterion, wherein the photo-story generator selects, when the overlapping images correspond to an identical photo-story, one of the overlapping images as an image to be used in the identical photo-story.

The photo-story creator may download at least one image used in a scene of the final template from the Internet.

The apparatus may further include a network interface configured to receive the plurality of photo images from at least one of a user terminal, a multimedia content sharing service server, and a social network service server.

According to an aspect of another exemplary embodiment, there is provided a method of displaying a photo-story on a user terminal, the method including displaying a list of photo-stories generated based on tags that indicate properties of a context of a plurality of photo images; and reproducing a photo-story that is selected from the list according to a user input.

The displaying of the list may include displaying respective titles of the photo-stories together with the tags that indicate properties of photo images included in each of corresponding photo-stories.

The displaying of the list may include displaying the titles hierarchically.

The method may further include displaying preferred tags, which are tags that are detected with a frequency higher than a threshold frequency from among the tags of the photo images, wherein the displaying of the list includes displaying a list of photo-stories that include at least one photo image that is mapped to at least one tag selected from the displayed preferred tags according to a user input.

The reproducing may include displaying only photo images that are mapped to a tag selected, by a user, from photo images of the selected photo-story.

The reproducing may include providing, while a photo image included in the selected photo-story and another photo-story is displayed, a user interface for jumping to the other photo-story.

According to an aspect of another exemplary embodiment, there is provided a user terminal including at least one memory device configured to store at least one program for displaying a photo-story; and at least one processor configured to execute the at least one program stored in the at least one memory device, wherein the at least one program includes instructions for performing displaying a list of photo-stories generated based on tags that indicate properties of a context of a plurality of photo images; and reproducing a photo-story that is selected from the list according to a user input.

The displaying of the list may include displaying respective titles of the photo-stories together with the tags that indicate properties of photo images included in each of corresponding photo-stories.

The displaying of the list may include displaying the titles hierarchically.

The program may further include displaying preferred tags, which are tags that are detected with a frequency higher than a threshold frequency from among the tags of the photo images, wherein the displaying of the list includes displaying a list of photo-stories that include at least one photo image that is mapped to at least one tag selected from the displayed preferred tags according to a user input.

The reproducing may include displaying only photo images that are mapped to a tag selected, by a user, from photo images of the selected photo-story.

The reproducing may include providing, while a photo image included in the selected photo-story and another photo-story is displayed, a user interface for jumping to the other photo-story.

According to an aspect of another exemplary embodiment, there is provided a non-transitory computer-readable recording medium having recorded thereon a program, which, when executed by a computer, performs a method including generating tags that indicate properties of a context of each of a plurality of photo images; predicting, based on the generated tags, scenes indicated by the photo images; and generating, based on the predicted scenes, at least one photo-story including a combination of the predicted scenes.

According to another aspect of an exemplary embodiment, there is provided an apparatus for generating a photo-story, the apparatus including at least one memory storing a plurality of photo images; and at least one processor configured to generate tags for each of the stored photo images, the tags including metadata of the photo image, and semantic information based on a visual context of the photo image;
assemble the plurality of photo images into a plurality of scenes based on the generated tags, each scene including a portion of the plurality of photo images; and generate a photo-story by combining a portion of the assembled scenes.

The at least one processor may generate the photo-story by matching the portion of the assembled scenes to scenes included in one of a plurality of photo-story templates, and replacing the scenes in the one of the templates with the matching scenes of the portion of the assembled scenes.

The at least one processor may detect similar photo images in the photo-story, selects one of the similar photo images to include in the photo-story and remove the remaining similar photo images from the photo-story.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
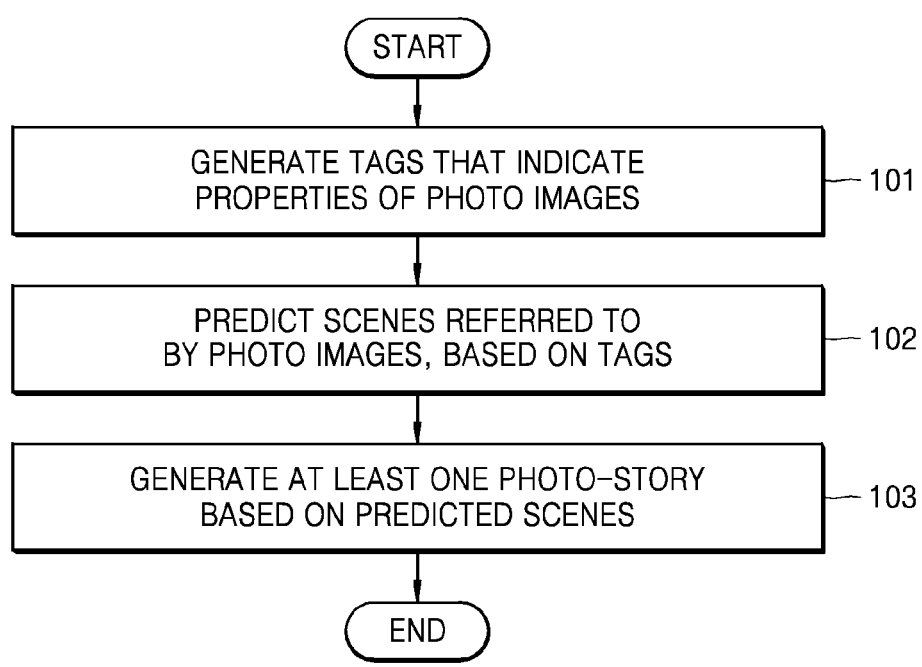
FIG. 1 is a flowchart of an overall process of generating a photo-story, according to an exemplary embodiment.

One of ordinary skill in the art to which the present disclosure pertains would be able to understand that components are simplified and clearly illustrated in the drawings regardless of the actual sizes of the components. For example, dimensions or locations of some components may be exaggerated in the drawings to facilitate understanding of various exemplary embodiments of the present disclosure.

Also, generally well-known components, which may be useful or necessary in an actual product, may be omitted for clarity. Although some operations or processes have been described or illustrated according to a specific order, it will be understood by one of ordinary skill in the art that the specific order is not absolutely necessary. Furthermore, unless defined otherwise, all terms or expressions used in the present disclosure have the same meaning as technical or scientific terms generally understood by one of ordinary skill in the art.

Exemplary embodiments shown in the drawings below may be described as one or more technical features when combined with technical features of other exemplary embodiments. Therefore, a technical feature described in an exemplary embodiment should not be construed as being limited to that exemplary embodiment, but may be disclosed in other exemplary embodiments. As used herein, the term "and/or" includes any and all combinations of one or more of the associated listed items. Expressions such as "at least one of," when preceding a list of elements, modify the entire list of elements and do not modify the individual elements of the list.

A photo-story is a service object generated by selecting a portion of visual content, i.e., photo images and videos, and arranging the selected visual content in a certain order. When a user reproduces the photo-story, the user may view a summarized collection without having to browse each one of the photo images or videos.

FIG. 1 is a flowchart of an overall process of generating a photo-story, according to an exemplary embodiment.

Visual content that is used in the photo-story does not only include images but also includes videos, because a video may be regarded as a sequence of many similar images. A frame may be selected from among frames of a video, and context in the selected frame may be analyzed in the same manner as an image. Accordingly, hereinafter, a 'photo image' includes an image captured from a video, and photo images that are input to a photo-story generation system according to an exemplary embodiment may include videos. A method of extracting a representative frame of a video will not be specified.

Turning to FIG. 1, in operation 101, an apparatus for generating a photo-story analyzes a data set of photo images input for generating the photo-story (hereinafter, referred to as 'input photo images') and generates tags that indicate properties of the photo images.

The properties of the photo images may include not only information acquirable from general metadata of the photo images, but also properties related to context of the photo images. The information acquirable from the general metadata may include, for example, a camera model and manufacturer, captured date and time of an image, image resolution, exposure time, whether flash is used, and a geographical location of an image. The properties related to the context of the photo images may include technical analysis information of the photo images, such as an average brightness, an average color, an image blur degree, and a frequency histogram, and semantic information acquired by analyzing visual context of the photo images, such as whether a background is indoors, the number of people, atmosphere of the image, and facial expressions of people.

In order to acquire the semantic information, the visual context of the photo images may be analyzed by using machine learning. Machine learning is a subfield related to artificial intelligence, which refers to a technology that allows computers to learn. Objects in a photo image are identified to analyze visual context of the photo image. To do so, first, a computer may learn visual pattern recognition models by using training images. Then, the computer may apply the recognition models on input photo images and find objects. This will be described below with reference to FIG. 4.

In operation 102, the apparatus for generating the photo-story predicts scenes referred to by the photo images, based on the tags generated in operation 101. A scene is a unit that configures the photo-story, and each scene may be defined according to a length (e.g., a number of images), a topic (e.g., a common topic among the images), etc. For example, a scene 'SPORTS' may include images related to soccer, swimming, running, etc. Therefore, the apparatus may predict that a photo image of a context including playing soccer with friends is included in the scene 'SPORTS.'

In operation 103, at least one photo-story is generated based on scenes predicted in operation 102. The at least one photo-story is configured of a combination of the predicted scenes.

In particular, from among a plurality of photo-story templates that define a structure of a photo-story, candidate templates that include predicted scenes are detected. According to an analysis of a matching degree of photo images included in the predicted scenes to the candidate templates, at least one of the candidate templates is selected. A photo-story is generated based on a finally selected photo-story template, and the generated photo-story is provided to a user.

The photo-story template may be predetermined or automatically generated via unsupervised machine learning. For example, in order to generate a photo-story 'SUMMER VACATION,' a scene 'BEACH' may be determined in a photo-story template. Alternatively, even when specific scenes are not determined, when identical people are recognized in various photo images, a new photo-story template related to a topic about the recognized people may be generated by collecting photo images that include the recognized people. For example, when faces recognized as friends of the user repeatedly appear in a plurality of photo images, a photo-story template with a title such as 'COLLEGE FRIENDS' may be generated.

As described above, a photo-story about photo images may be automatically generated based on not only a chronological order, but also various pieces of information acquired by analyzing visual context of the photo images.

Figure 2:
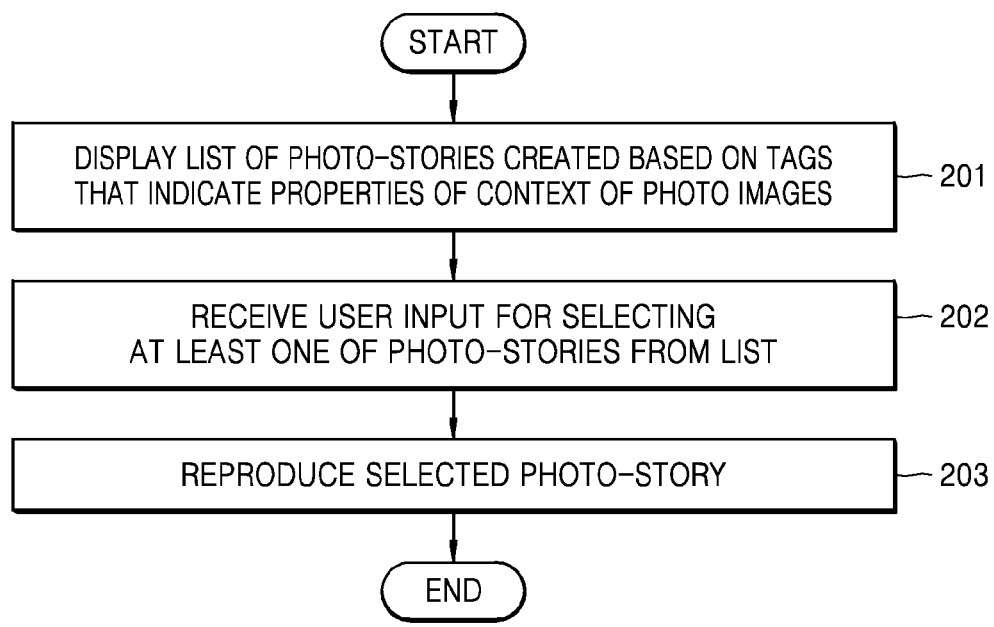
FIG. 2 is a flowchart of a process of reproducing a photo-story, according to an exemplary embodiment.

FIG. 2 is a flowchart of a process of reproducing the photo-story, according to an exemplary embodiment.

The process of generating the photo-story as an abstract of numerous photo images has been described with reference to FIG. 1. With reference to FIG. 2, a method of providing the generated photo-story to the user via a user terminal such as a smartphone will be described.

In operation 201, the user terminal displays a list of photo-stories that are generated based on the tags that indicate the properties of the context of the photo images. The list may include identifiers of the photo-stories, for example, titles of the photo-stories. When displaying the list of the photo-stories, respective identifiers (e.g., titles) of the photo-stories may be displayed together with respective tags that indicate the properties of photo images in each of the photo-stories. Accordingly, the user may easily recognize which photo-story is generated based on the tags.

From among tags mapping the photo images used to generate the photo-story, tags that frequently appear may be displayed on a screen. When the user selects at least one of the tags, a list of photo-stories that include a photo image mapped to the selected tag is displayed. Accordingly, the user may browse only photo-stories that include an image about a context of personal interest.

Since an identical photo image may be commonly included in various photo images, the identifiers of the photo-stories may be hierarchically displayed in the list of photo-stories.

In operation 202, a user input of selecting at least one photo-story from the list is received.

In operation 303, the photo-story selected by the user is reproduced. For example, a slide show of photo images in the photo-story may be displayed on the screen according to an order, and appropriate effects or background music may be added. The order may be predetermined.

The user may select a tag of personal interest from the selected photo-story. When the user selects the tag, only photo images that are mapped to the selected tag, i.e., photo images with properties corresponding to the selected tag, are displayed from among the photo-images in the photo-story.

In the case that the user selects a photo-story from the list of photo-stories and reproduces the photo-story, when a photo image included in not only the currently reproduced photo-story but also another photo-story is displayed, a user interface for jumping to the other photo-story may be provided. This will be described below with reference to FIG. 5.

Figure 3:
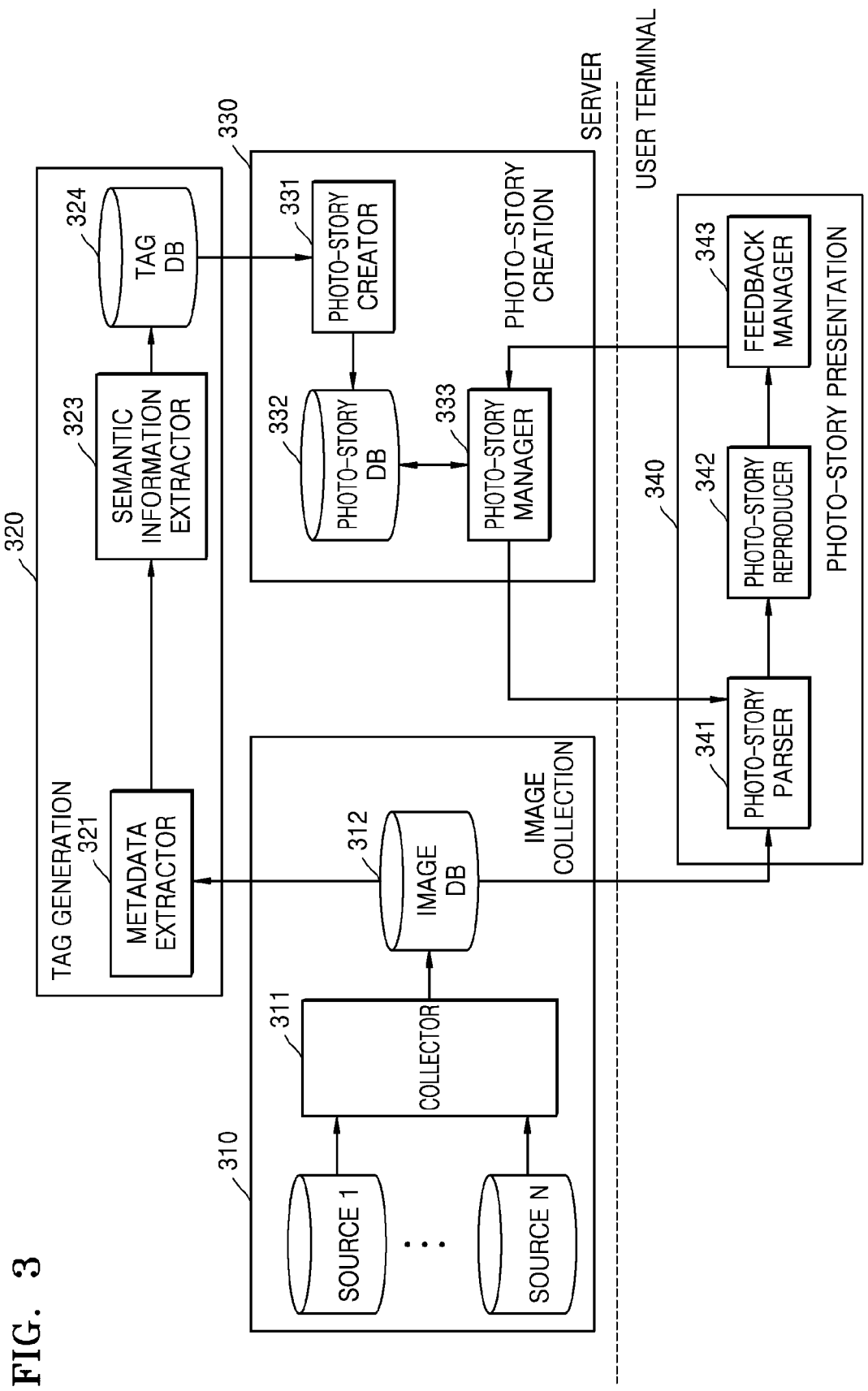
FIG. 3 is a block diagram of an overall structure of a system for providing a photo-story to a user, according to an exemplary embodiment.

FIG. 3 is a block diagram of an overall structure of a system for providing a photo-story to a user, according to an exemplary embodiment.

The system of FIG. 3 may be configured of four function blocks including an image collection block 310, a tag generation block 320, a photo-story generation block 330, and a photo-story presentation block 340. As shown in FIG. 3, operations such as image collection, tag generation, and photo-story generation may be performed by a server because such operations use a large storage space and high performance processing, and photo-story creation may be performed by a user terminal. However, the operations are not limited to the present exemplary embodiment.

The image collection block 310 may include sources SOURCE 1 to SOURCE N, a collector 311, and an image database (dB) 312. The collector 311 finds videos and photo images from various sources SOURCE 1 to SOURCE N that are to be used for creating the photo-story and stores the videos and the photo images in the image database (DB) 312. According to the present exemplary embodiment, visual content distributed in various sources SOURCE 1 to SOURCE N are stored in one image DB 312 because it is generally difficult to perform an image analysis at a third party domain. However, exemplary embodiments are not limited thereto, and collected visual content may be separately stored in a plurality of servers.

The visual content may be collected from various sources. It is not necessary for a video or an image to be owned by an identical person. For example, the video and images may be present in various different accounts of a person that use different login criteria, e.g., username and password. Alternatively, the video and images may belong to different people, for example family members and/or friends of the user. A source of the visual content may include a mobile phone of the user, a personal computer (PC), a cloud server, a social network service (SNS) server, etc. Therefore, in order to automatically generate the photo-story without intervention of the user, the collector 311 may store an ID and a password to log in to a cloud server or an SNS account. Thus, in the case in which the video and images are owned by family members or friends of the user, the collector 311 may store an ID and password of the family members or friends to access a cloud server or SNS account storing the video and image. Similarly, in the case in which the user has different accounts across different platforms and/or services, the collector 311 may store an ID and password to log in to each platform and/or service.

The user terminal may synchronize the user terminal and the visual content stored in the image DB 312 via a software agent.

The tag generation block 320 may include a metadata extractor 321, a semantic information extractor 323, and a tag database (dB) 324. The metadata extractor 321 may load the photo images from the image DB 312, extract metadata from image files, and generate a tag. A format of the metadata is not limited to a specific format. For example, the format may include Exchangeable image file format (Exif) or Extensible Metadata Platform (XMP). The metadata may include information about a camera model and manufacturer, captured date and time of an image, image resolution, exposure time, a lens focal length, whether flash is used, a color space, and a location where an image is captured.

A semantic information extractor 323 may extract semantic information of the photo image, i.e., information about visual context of the image, and generate a tag. In this case, metadata extracted from the metadata extractor 321 may be used.

In order to extract the semantic information of the photo image, objects such as backgrounds or people, and/or action of a person may be recognized by using machine learning. Accordingly, the semantic information extractor 323 may determine a representation for showing features of the photo image, and extract the semantic information of the photo image based on models obtained by applying a learning algorithm to a training data set. This will be described below with reference to FIG. 4.

The semantic information extractor 323 may compare similarities between the photo images by using features of the photo images. The photo images being similar include the photo images being semantically similar. Furthermore, quality of the photo images may be evaluated according to various criteria, by using technical features or the semantic information of the photo images. For example, the quality of photo images may be evaluated according to the technical features such as an overall color or image blurs, and the semantic information such as an atmosphere of the photo image or a facial expression of a person.

A result of similarity and quality evaluation may be utilized for various purposes. For example, the result may be referenced when classifying a photo image as a scene or a topic. Alternatively, the result may be utilized to identify whether there are overlapping images among the input photo images. Alternatively, based on the result, some quality photo image may be selected from among similar photo images, and the selected photo image may be used in a photo-story.

A tag DB 324 may store tags that indicate various pieces of information about the photo images. That is, the tags may indicate the metadata extracted by the metadata extractor 321 and/or the semantic information extracted by the semantic information extractor 323.

The photo-story generation block 330 may include a photo-story creator 331, a photo-story database (dB) 332, and a photo-story manager 333. The photo-story creator 331 creates a photo-story with reference to the tags stored in the tag DB 324. In particular, the photo-story creator 331 analyzes the tags and determines a photo-story topic, and generates a photo-story file according to a photo-story template related to the topic. The photo-story template will be described below with reference to FIG. 6.

The photo-story file generated by the photo-story creator 331 is stored in a photo-story DB 332. The photo-story file defines a structure of the photo-story, and thus may include an identifier of the photo images used in the photo-story, an order of the photo images, a visual effect (e.g., brightness adjustment), background music, etc.

The photo-story manager 333 transmits the photo-story file to the user terminal. The photo-story manager 333 also manages the photo-story files stored in the photo-story dB 332, and may, for example, write, read, index, delete, and/or perform other management tasks related to the photo-story files.

The photo-story presentation block 340 may include a photo-story parser 341, a photo-story reproducer 342 and a feedback manager 343. The photo-story presentation block 340 may be implemented on a user terminal. The photo-story parser 341 parses the photo-story file and loads a photo image and relevant data used for reproducing the photo-story from the image DB 312. A photo-story reproducer 342 may receive the photo image and the relevant data from the photo-story parser 341 and render the photo-story. A feedback manager 343 notifies the photo-story manager 333 when the user edits or deletes the photo-story, and the photo-story manager 333 updates the photo-story file stored in the photo-story DB 332 with respect to a user command. ****

Figure 4:
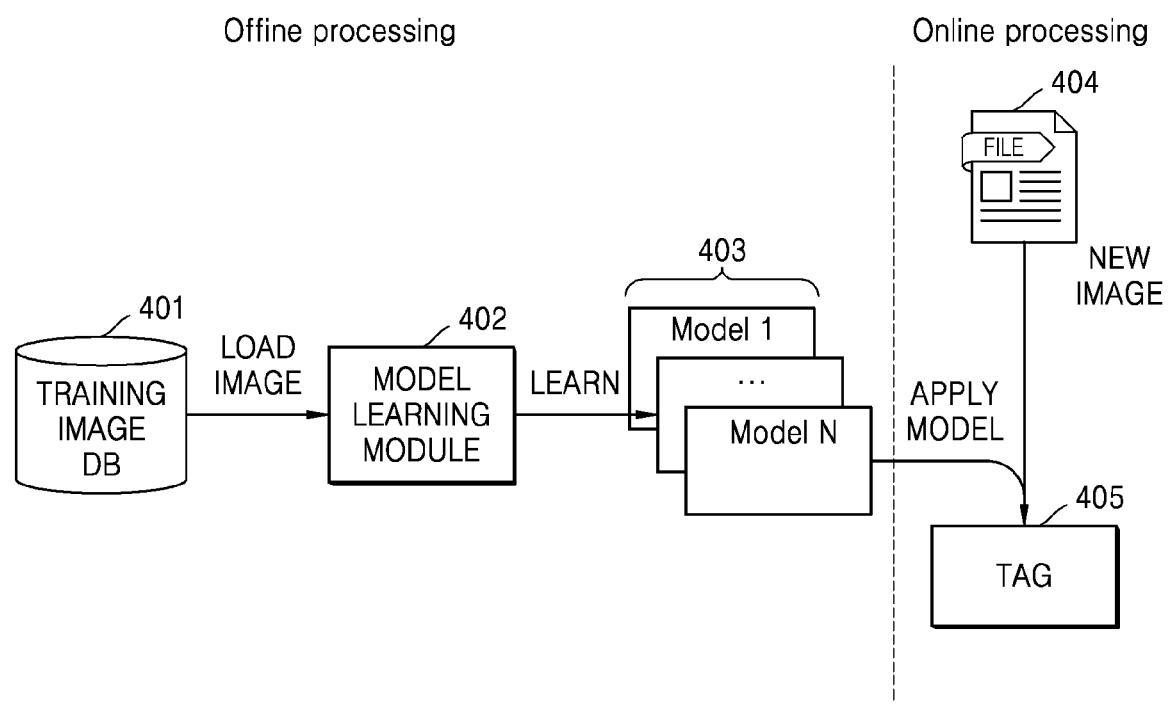
FIG. 4 is a conceptual diagram of a method of extracting semantic information from photo images, according to an exemplary embodiment.

FIG. 4 is a conceptual diagram of a method of extracting semantic information from photo images, according to an exemplary embodiment.

The machine learning technique may be used to predict context of various photo images, i.e., to extract semantic information from the photo images. In particular, a model learning module 402 may apply at least one learning algorithm to training images, and thus obtain classifiers for analyzing the visual context of the photo images, i.e., visual pattern recognition models 403. The models MODEL 1 to MODEL N may predict a visual context of a photo image 404. For example, a model may function as a classifier for facial identification, and another model may function as a classifier for cat identification.

A training image DB 401 may include training images that are used for the model learning module 402 to generate the models 403. The learning algorithm of the model learning module 402 may use partition techniques, such as repeated random sub-sampling, n-fold cross-validation, leave-one-out, etc., so as to divide a training image data set into training data and validation data.

Before the training images are input to the model learning module 402 or before a model is applied to new images 404 that are to be actually analyzed, a pre-processing operation may be performed on such images. In order to analyze the photo images and effectively classify the photo images according to respective context (e.g., according to a detected object), it is advantageous to determine a representation by which features of the photo images are to be modeled. The pre-processing operation allows for optimization of the representation. For example, features may be removed from an image by resizing, cropping, contrast normalization, noise reduction, etc.

Image representation may be determined by using a deep neural network architecture that is a model learning technique that uses a neural network of a human as a model. Since photo-images used for generating a photo-story are usually captured by individuals, there may be difficulty in terms of predictability and a lack of training data. However, image representation determined via the deep neural network may be generally applied to various photo images regardless of a specific topic.

The models 403 generated by the model learning module 402 predict and evaluate the photo images 404. For example, the models 403 may respectively perform operations such as object detection, face recognition, and visual aesthetics assessment. One model may be allocated to two or more operations.

One model may be dependent on another model. For example, a model detecting a car from an image may be triggered when a scene detecting model classifies a scene as 'ROAD SCENE.' Also, various models may be combined and operate as a signal model so that variance of prediction is reduced.

Accordingly, the context of the photo image 404 may be predicted by applying the models 403 generated via machine learning to the photo image 404, and at least one tag 405 that indicates the predicted context may be generated. The at least one tag 405 may indicate, for example, a presence of a specific object in an image, an identity of a particular object, a location of a detected object, an identifier indicating another image having the same or similar context as a specific image, and semantic information found via unsupervised machine learning.

As shown in FIG. 4, a process of generating the visual pattern recognition models 403, i.e., a training process, does not have an execution time restriction, and thus may be performed offline. Once the models 403 have been learned, the models 403 may be reused numerous times unless a new learning algorithm or a new training image is adapted. Before applying the models 403 to the photo image 404 so as to generate the photo-story, a pre-processing operation may be performed on the photo image 404 as in the training stage.

Figure 5:
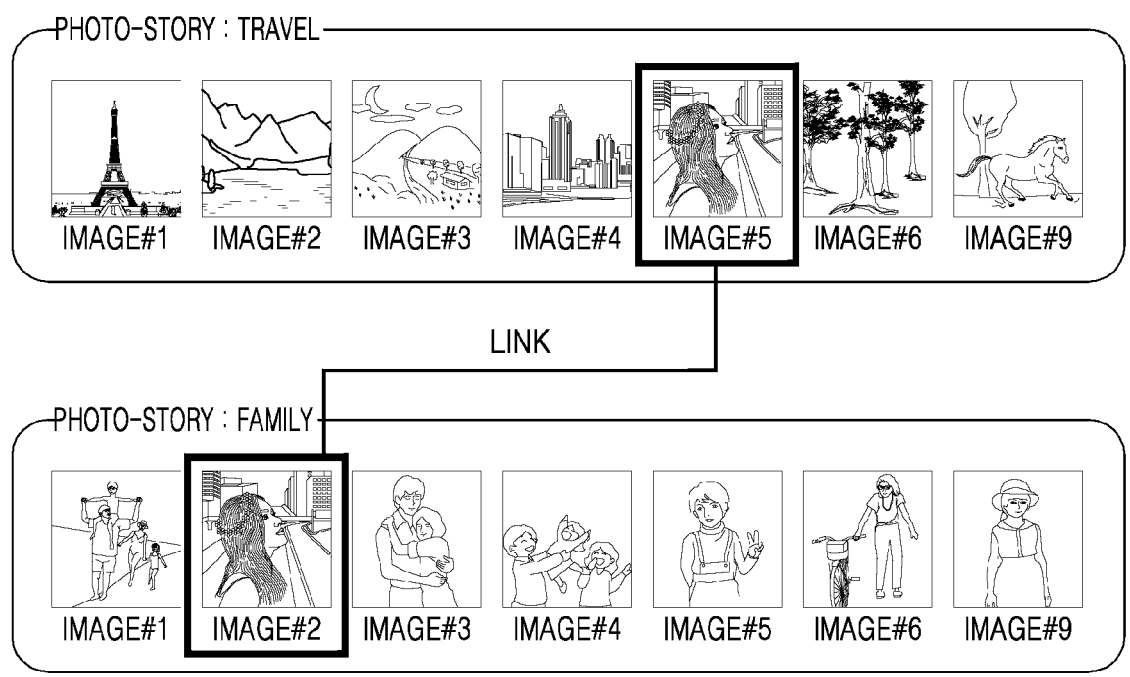
FIG. 5 is a diagram for describing an intersection point between different photo images, according to an exemplary embodiment.

FIG. 5 is a diagram for describing an intersection point between different photo images, according to an exemplary embodiment.

The system for providing the photo-story according to an exemplary embodiment may analyze the visual context of the photo images and automatically generate photo-stories with various topics. Therefore, identical photo images may be commonly used in two or more different photo-stories. Similarly, technically or semantically similar photo images may be commonly used in two or more different photo-stories. Such identical or similar images that are commonly used in a plurality of photo-stories may function as intersection points between the photo-stories. A user terminal for reproducing the photo-story may use an intersection point between the photo-stories to provide a function of jumping to another photo-story that is highly relevant to a currently displayed photo image while the user is watching a photo-story.

As shown in FIG. 5, according to the present exemplary embodiment, from among photo images used in a photo-story 'TRAVEL,' an image taken with the user and his/her family while travelling has been also used in a photo-story 'FAMILY.' Accordingly, the two images may be linked to one another and function as an intersection point between the two photo-stories. In particular, the user may click (or touch) the image while watching the photo-story 'TRAVEL' to immediately move to the photo-story 'FAMILY.' Although 'clicking' has been provided as an example, a user interface for jumping between the photo-stories is not limited thereto. For example, a message showing that an identical or similar image has been also used in the photo-story 'FAMILY' may be displayed with a menu for inquiring the user whether to move to the photo-story 'FAMILY.'

As discussed above, the photo images that function as the intersection points between the photo-stories do not have to be identical. The photo images may function as intersection points even when the photo images are technically or semantically similar to one another.

Figure 6:
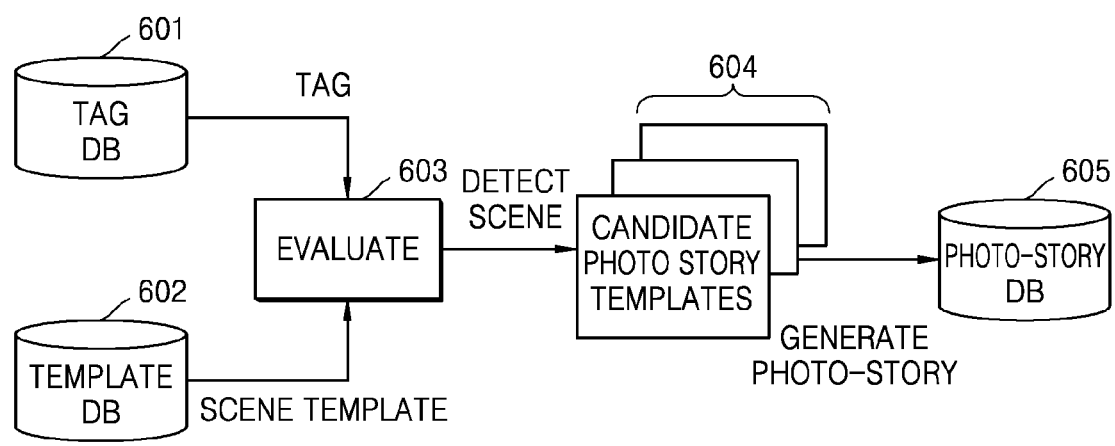
FIG. 6 is a conceptual diagram for describing a method of generating a photo-story, according to an exemplary embodiment.

FIG. 6 is a conceptual diagram for describing a method of generating a photo-story, according to an exemplary embodiment.

A system according to an exemplary embodiment analyzes tags generated based on photo images and determines a photo-story that may be created by using the photo images. A template database (DB) 602 stores scene templates for defining properties of scenes and photo-story templates for defining structures of photo-stories. That is, the scene template informs that photo images with specific properties are to be included in a specific scene. Therefore, it is possible to predict which photo images are included in which scene and evaluate (603) a matching degree between the photo images and the scene by classifying tags stored in a tag database (DB) 601 via the machine learning technique. In some cases, one photo image may be included in two or more scenes. For example, a photo image including a person riding a bicycle may be included in a scene 'SPORTS' and a scene 'PERSON.'

The photo-story templates stored in the template DB 602 define the structures of the photo-stories, and scenes used for each of the photo-story templates are specified. Since scenes that may be configured as photo images are determined when analysis of the tags is finished, candidate photo-story templates 604, which may be generated by a combination of predicted scenes, are determined. The photo-stories are generated based on the candidate photo-story templates 604, and a photo-story file is stored in a photo-story database (DB) 605. Then, the photo-story file stored in the photo-story DB 605 is transmitted to the user terminal, and thus, the user receives the photo-stories.

According to an exemplary embodiment, a photo-story may be generated only when a matching degree between photo images in candidate photo-story templates and scenes is equal to or greater than a threshold degree. As described above, since the matching degree between the photo images and the scenes is evaluated when the photo images are classified according to scenes, it is possible to evaluate a comprehensive matching degree between the photo images and the photo-story templates, and thus, a relative order of the candidate photo-story templates may be determined based on a photo-story completion degree.

Figure 7:
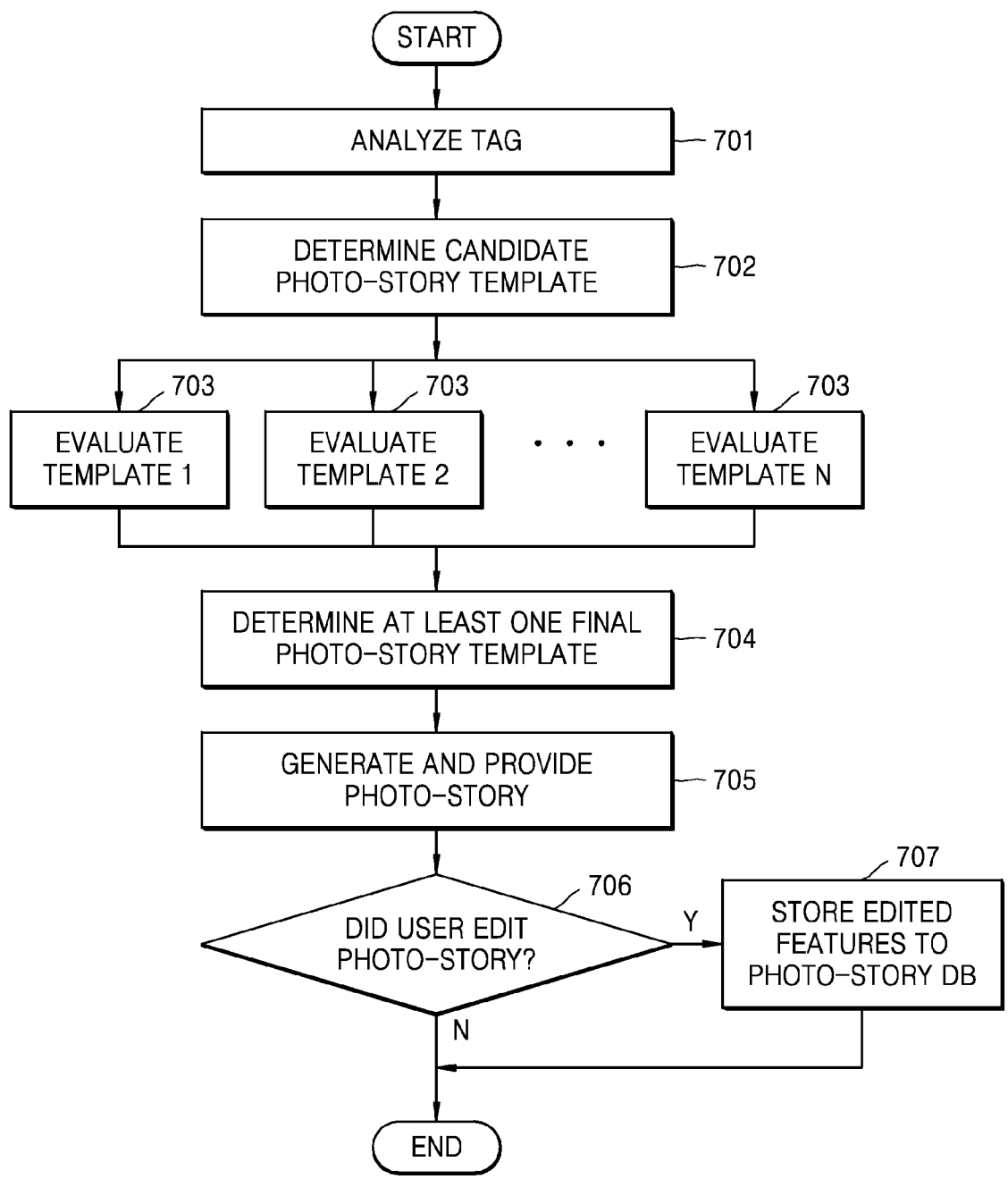
FIG. 7 is a flowchart of generating a photo-story based on a tag, according to an exemplary embodiment.

FIG. 7 is a flowchart of generating a photo-story based on a tag, according to an exemplary embodiment.

In operation 701, tags are analyzed. For example, scenes including photo images are predicted by analyzing the tags of the photo images. In this case, a matching degree between the photo images and the scenes is evaluated.

In operation 702, a candidate photo-story template is determined. For example, a candidate photo-story template that corresponds to a topic that may be determined based on a combination of the predicted scenes.

In operation 703, templates TEMPLATE 1 to TEMPLATE N are evaluated. For example, a completion degree of N candidate photo-story templates is evaluated. In particular, since the matching degree between the scenes and photo images is evaluated when predicting the scenes that correspond to the photo-stories, a comprehensive matching degree between the photo images and the candidate photo-story templates may also be evaluated when a photo-story is configured according to the candidate photo-story templates.

In operation 704, at least one final photo-story template is determined. For example, the at least one final photo-story template may be determined from among the candidate photo-story templates, based on the evaluation result of operation 703.

In operation 705, a photo-story is generated based on the final photo-story template, and the generated photo-story is provided to the user.

In operation 706, it is determined whether the user has edited the photo-story via the user terminal. When it is determined that the user has not edited the photo-story (operation 706, NO), the process ends. On the other hand, when it is determined that the user has edited the photo-story (operation 706, YES) the edited photo-story is stored in a photo-story database.

Figure 8:
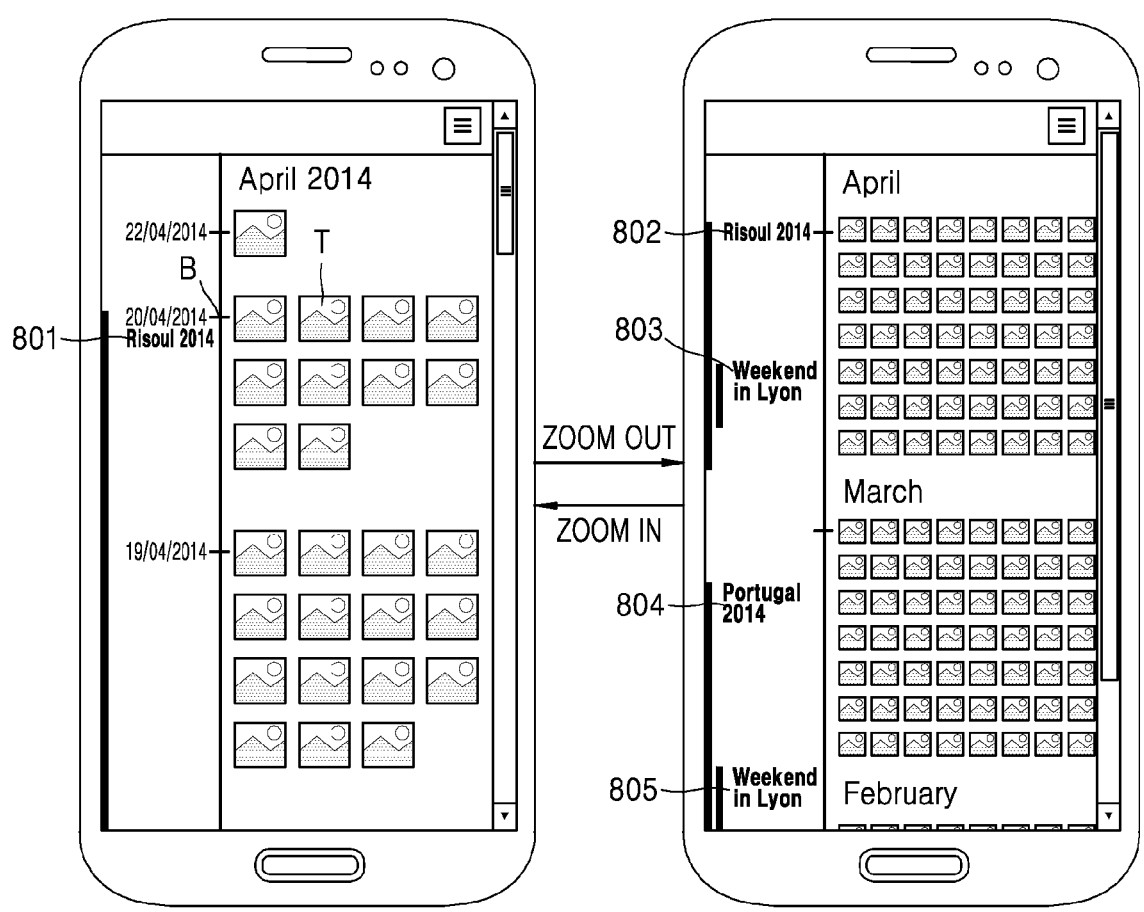
FIG. 8 is a diagram of screens on a mobile device displaying a plurality of photo-story titles, according to an exemplary embodiment.

FIG. 8 is a diagram of screens on a mobile device displaying a plurality of photo-story titles, according to an exemplary embodiment. Hereinafter, the photo-story title is described as an example of an identifier of a photo-story. However, this is only an example, and one of ordinary skill in the art would be able to understand that other types of photo-story identifiers may be implemented based on the present disclosure.

A left screen shows a photo-story title 801 called 'Risoul 2014.' Also, the left screen shows thumbnail images T of photo images stored in a mobile device of the user, and a bar B indicating which photo images are included under a specific photo-story.

When the user performs, for example, a pinch gesture on the left screen to zoom out, a right screen is shown. That is, by zooming out, a timeline shows titles of photo-stories in the past that were not shown on the left screen. For example, three photo-story titles, i.e., 'Weekend in Lyon,' 'Portugal 2014,' and 'Weekend in Lisbon' are hierarchically shown. That is, 'Risoul 2014' 802 includes 'Weekend in Lyon' 803, and 'Portugal 2014' 804 includes 'Weekend in Lisbon' 805. As described above, the system according to the exemplary embodiments automatically predicts scenes with respect to input photo images by using the machine learning technique and generates a photo-story, and thus, an identical photo image may be commonly used in a plurality of photo-stories. When the user inputs a zoom-in command on the right screen by performing, for example, a spread gesture, the left screen may be displayed again.

Figure 9:
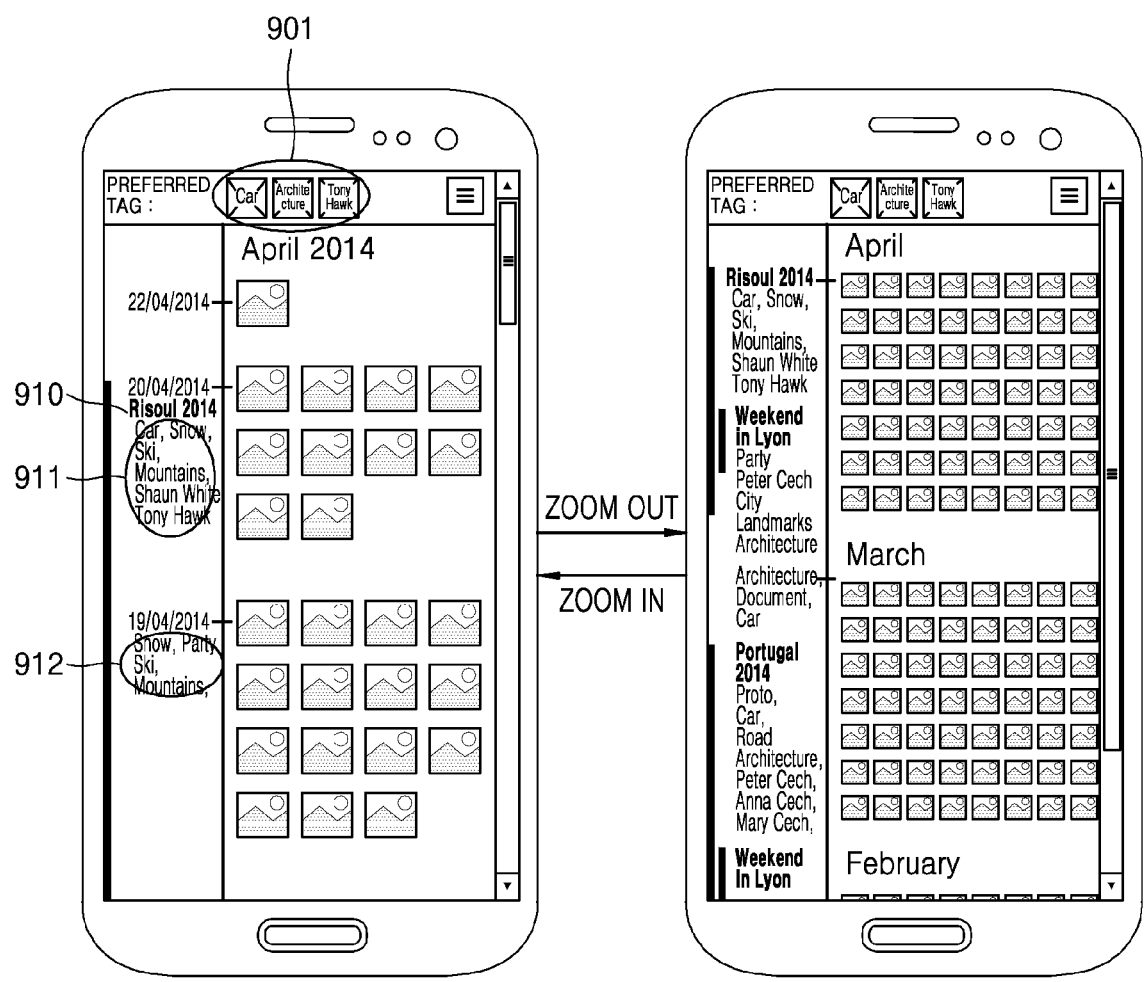
FIG. 9 is a diagram of screens on a mobile device displaying a photo-story title together with relevant tags, according to an exemplary embodiment.

FIG. 9 is a diagram of screens on a mobile device displaying a photo-story title together with relevant tags, according to an exemplary embodiment.

Referring to a left screen, preferred tags 901 that are preferred by the user are shown on an upper side. The preferred tags 901 may be automatically selected based on appearance frequency from among tags of input photo images. Alternatively, the user may manually select preferred tags.

When the user performs, for example, a pinch gesture on the left screen to zoom out, a right screen is shown, and thus, titles of photo-stories in the past that were not shown on the screen may be displayed. Alternatively, when the user inputs a zoom-in command on the right screen by performing, for example, a spread gesture, the left screen may be displayed again.

As shown in FIG. 9, a photo-story title 910 is displayed together with tags 911 and 912 that indicate properties of photo images used in a specific photo-story. Therefore, the user may conveniently recognize which photo-story includes photo images of which context, without reproducing the photo-stories.

Figure 10A:
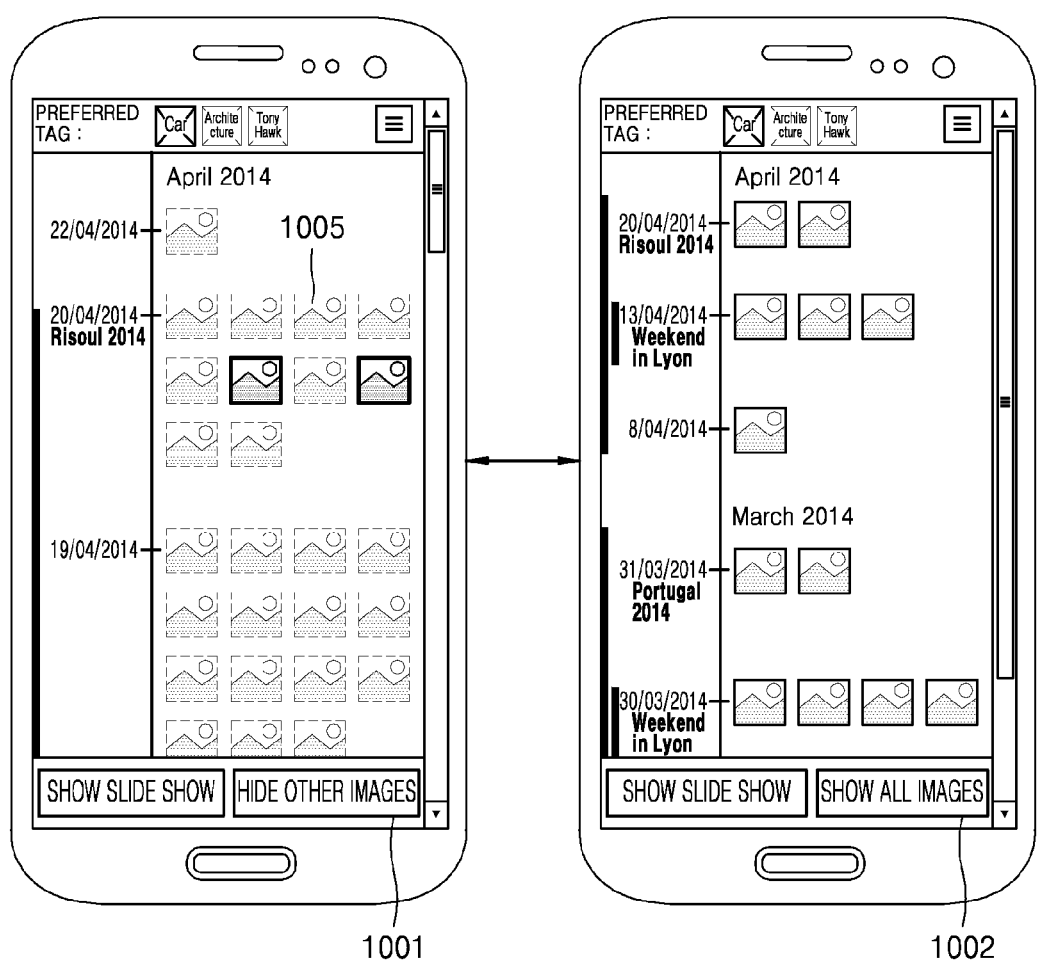
FIGS. 10A and 10B are diagrams of screens on a mobile device displaying photo images that are related to a tag of interest to a user, according to an exemplary embodiment.
Figure 10B:
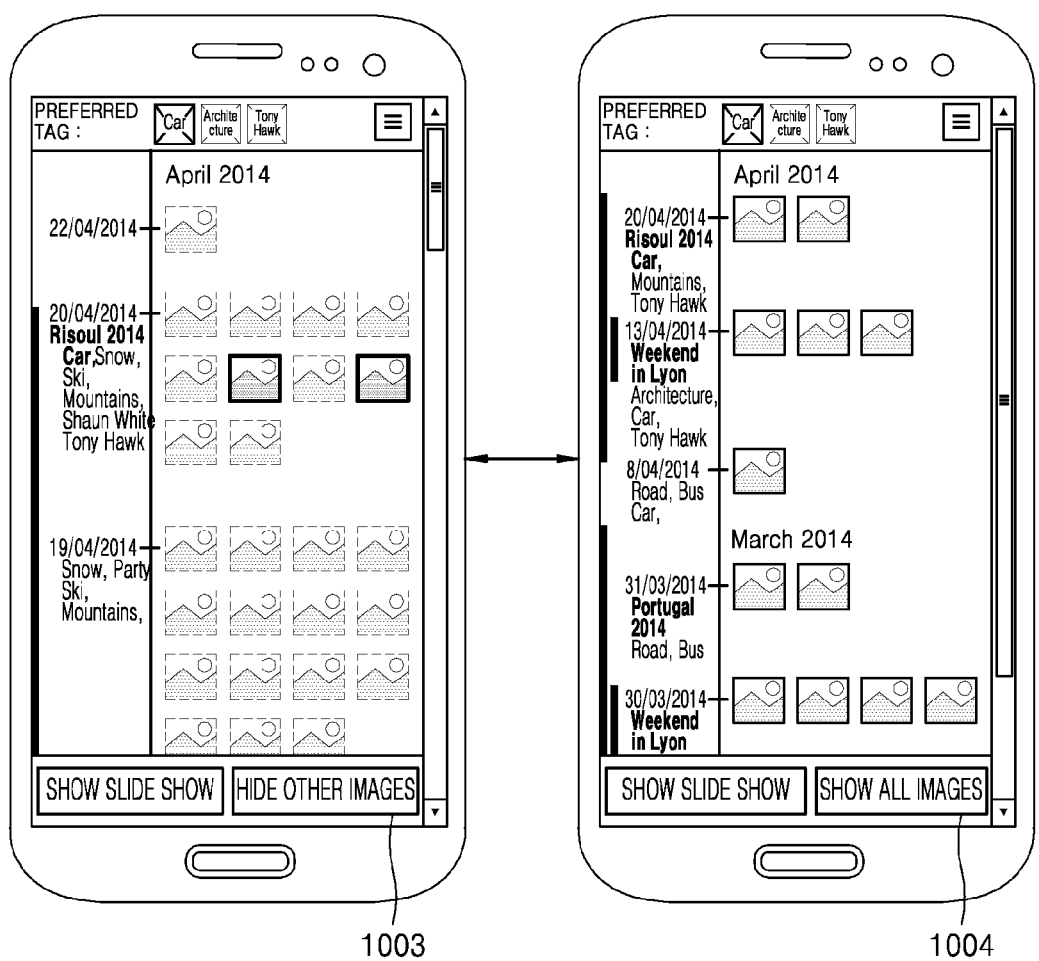

FIGS. 10A and 10B are diagrams of screens on a mobile device displaying photo images that are related to a tag of interest to a user, according to an exemplary embodiment.

When the user selects a tag 'Car' from among the preferred tags on the left screen of FIG. 9, as shown in a left screen of FIG. 10A, photo images with tags 1005 that do not include the tag 'Car' are grayed out. In this case, when the user presses a 'HIDE OTHER IMAGES' button 1001, the left screen changes to a right screen and the grayed out photo images are hidden. In this case, only the two photo images with darkened border on the left image are shown next to "Risoul 2014" in the right image. When the user presses a 'SHOW ALL IMAGES' button 1002 on the right screen, the right screen changes to the left screen. When the user reproduces a slide show of a photo-story while only the tag 'Car' is selected, only photo images that are mapped to the tag 'Car' are sequentially displayed.

When the user selects at least one preferred tag, a title of a photo-story, which does not include a photo image mapped to the selected tag, may not be displayed on a screen.

FIG. 10B shows an exemplary embodiment similar to that of FIG. 10A, and shows photo images that are only related to a tag selected by the user. However, unlike FIG. 10A, tags related to the title of the photo-story are displayed together.

When the user presses a 'HIDE OTHER IMAGES' button 1003, a left screen 1000L changes to a right screen as shown, and grayed out photo images are hidden. When the user presses a 'SHOW ALL IMAGES' button 1004 on the right screen, the right screen changes to the left screen.

Figure 11A:
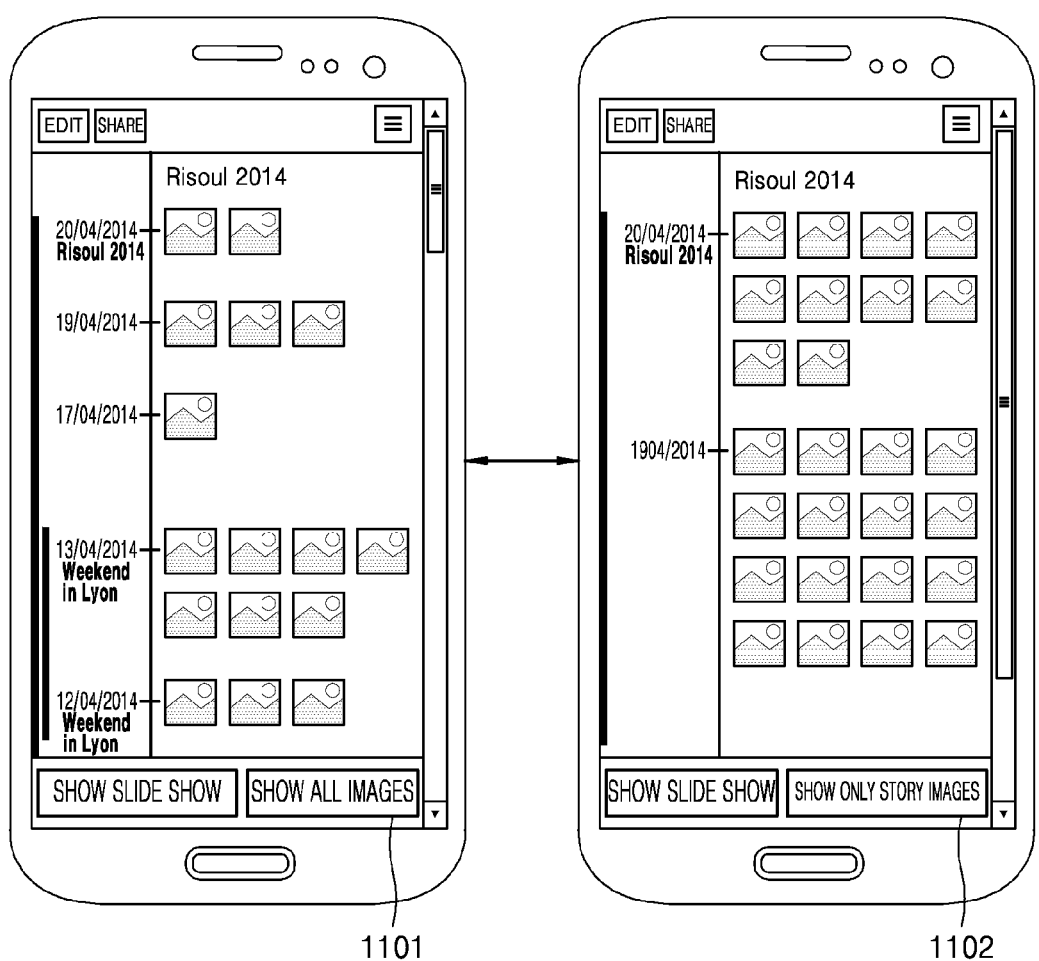
FIGS. 11A and 11B are diagrams of screens displayed on a mobile device when a photo-story title is selected, according to an exemplary embodiment.
Figure 11B:
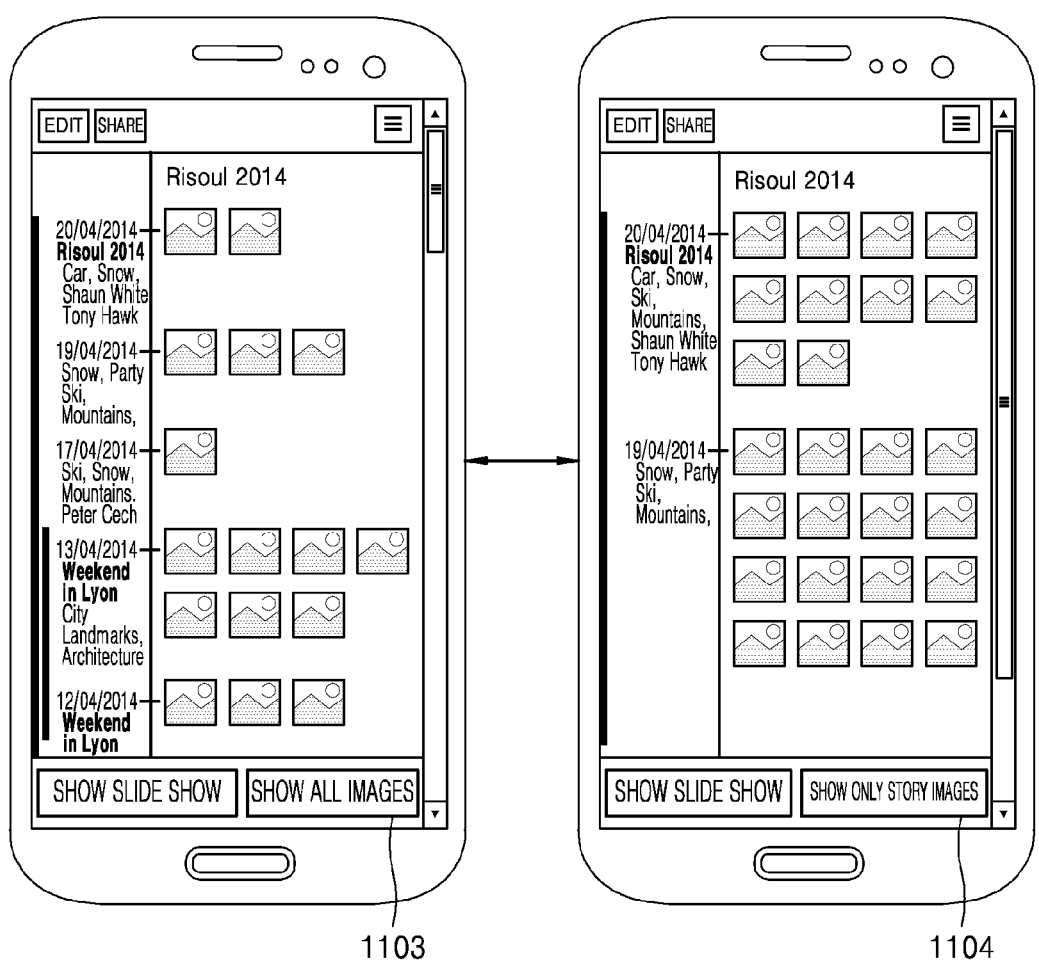

FIGS. 11A and 11B are diagrams of screens displayed on a mobile device when a photo-story title is selected, according to an exemplary embodiment.

When the user selects the photo-story title 'Risoul 2014' on the screen of FIG. 8, a left screen of FIG. 11A is displayed. That is, thumbnail images of photo images included in the photo-story are displayed. When a 'SHOW ALL IMAGES' button 1101 is pressed on the left screen, the left screen changes to a right screen. When a 'SHOW ONLY STORY IMAGES' button 1102 is pressed on the right screen, the right screen changes to the left screen.

The right screen displays thumbnail images of photo images that are not included in the photo-story, from among photo images matched to scenes of the photo-story. When evaluating based on various criteria in the case that photo images that include identical or similar tags are present, it is more efficient to include a photo image with relatively better quality in the photo-story. For example, a photo image with high resolution or less image blurs on a face may be determined as a high quality photo image. Also, even when no other similar photo images are present, when a quality of a photo image does not exceed a threshold quality, the photo image may not be included. The threshold quality may be predetermined.

As shown in screens of FIG. 11A, the user may press an 'EDIT' button and edit a photo-story. For example, the user may delete a photo image from the photo-story or add a new photo image to the photo-story.

Although the present exemplary embodiment shows that when the user select a photo-story from a photo-story list, thumbnail images on a timeline are shown first and then a slide show is reproduced by using a separate button as shown in FIG. 11A, a method of reproducing the photo-story is not limited thereto. For example, when the user clicks (or touches) a title of a photo-story, a slide show of the photo-story may be immediately reproduced.

FIG. 11B shows an exemplary embodiment similar to that of FIG. 11A, and shows thumbnail images of photo images in the photo-story selected by the user from the photo-story list. When a 'SHOW ALL IMAGES' button 1103 is pressed on a left screen, the left screen changes to a right screen, and when a 'SHOW ONLY STORY IMAGES' button 1104 is pressed on the right screen, the right screen changes to the left screen.

However, according to the present exemplary embodiment, unlike FIG. 11A, tags related to the title of the photo-story are displayed together. The left screen shows two photo images captured at Apr. 20, 2014 included in the photo-story, and the right screen shows ten photo images at the same date. Accordingly, it may be understood that two out of ten photo images have been used in the photo-story, and tags 'SKI' and 'MOUNTAINS,' which are not shown on the left screen but shown on the right screen, have been generated based on the remaining eight photo images.

Figure 12A:
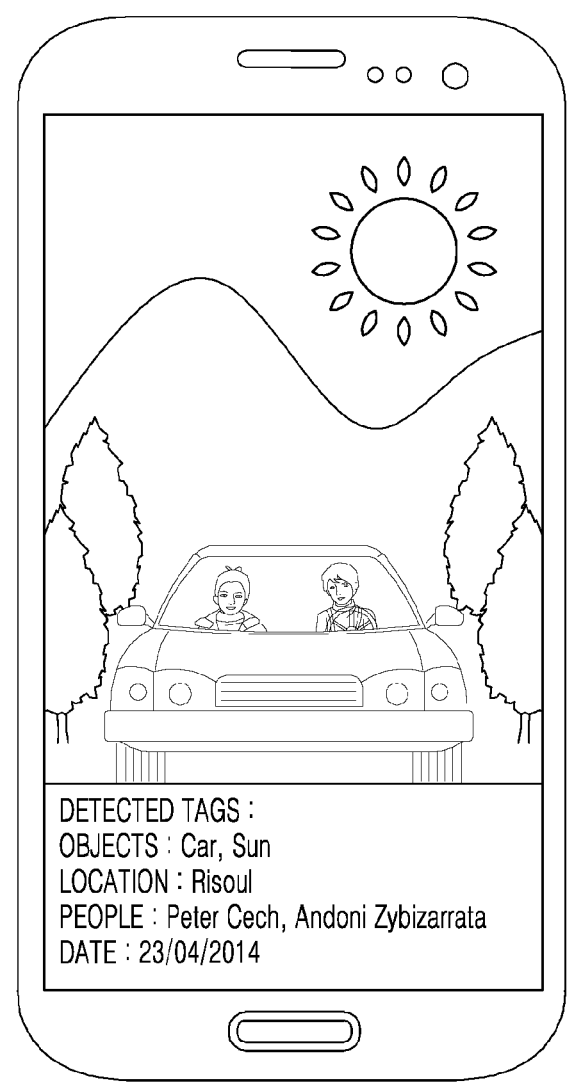
FIGS. 12A to 12C are diagrams of screens displayed on a mobile device when a photo-story is reproduced, according to an exemplary embodiment.
Figure 12B:
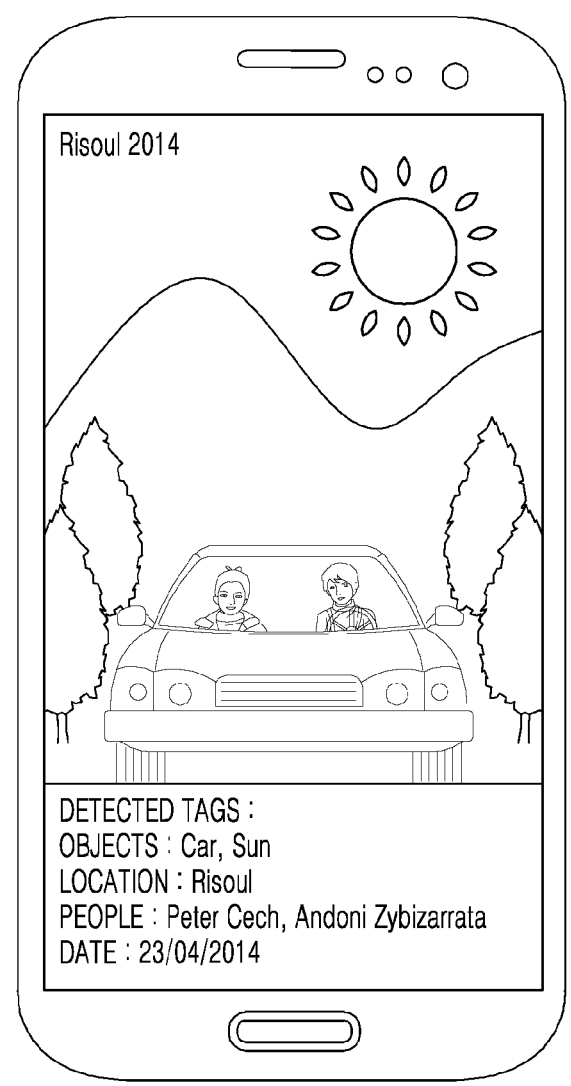
Figure 12C:
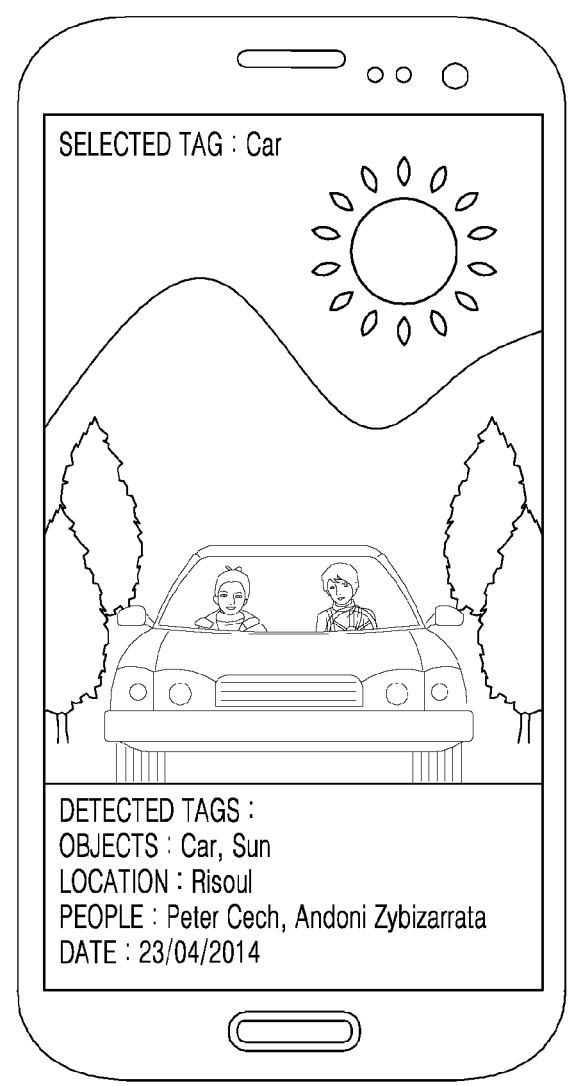

FIGS. 12A to 12C are diagrams of screens displayed on a mobile device when a photo-story is reproduced, according to an exemplary embodiment.

When the user presses a 'SHOW SLIDE SHOW' button on any of the screens of FIGS. 10A to 11B, a slide show of the photo images in the photo-story is reproduced. In this case, a screen of any one of FIGS. 12A to 12C may be displayed.

FIG. 12A shows tags that are extracted from a currently displayed photo image. According to the present exemplary embodiment, properties such as an object detected from the photo image, a photography location, people, and a photography date are displayed. The object and the people are regarded as semantic information that is acquired via the machine learning technique, and the photograph location and date may be acquired via metadata analysis.

FIG. 12B is similar to FIG. 12A, but different in that a title of a currently reproduced photo-story is displayed on an upper side of the screen.

FIG. 12C is similar to FIG. 12A, but different in that a currently selected tag is displayed on an upper side of the screen. As described above with reference to FIGS. 10A and 10B, the user may select a tag and browse photo-stories related to the tag, or browse photo images mapped to the tag in a single photo-story.

Figure 13:
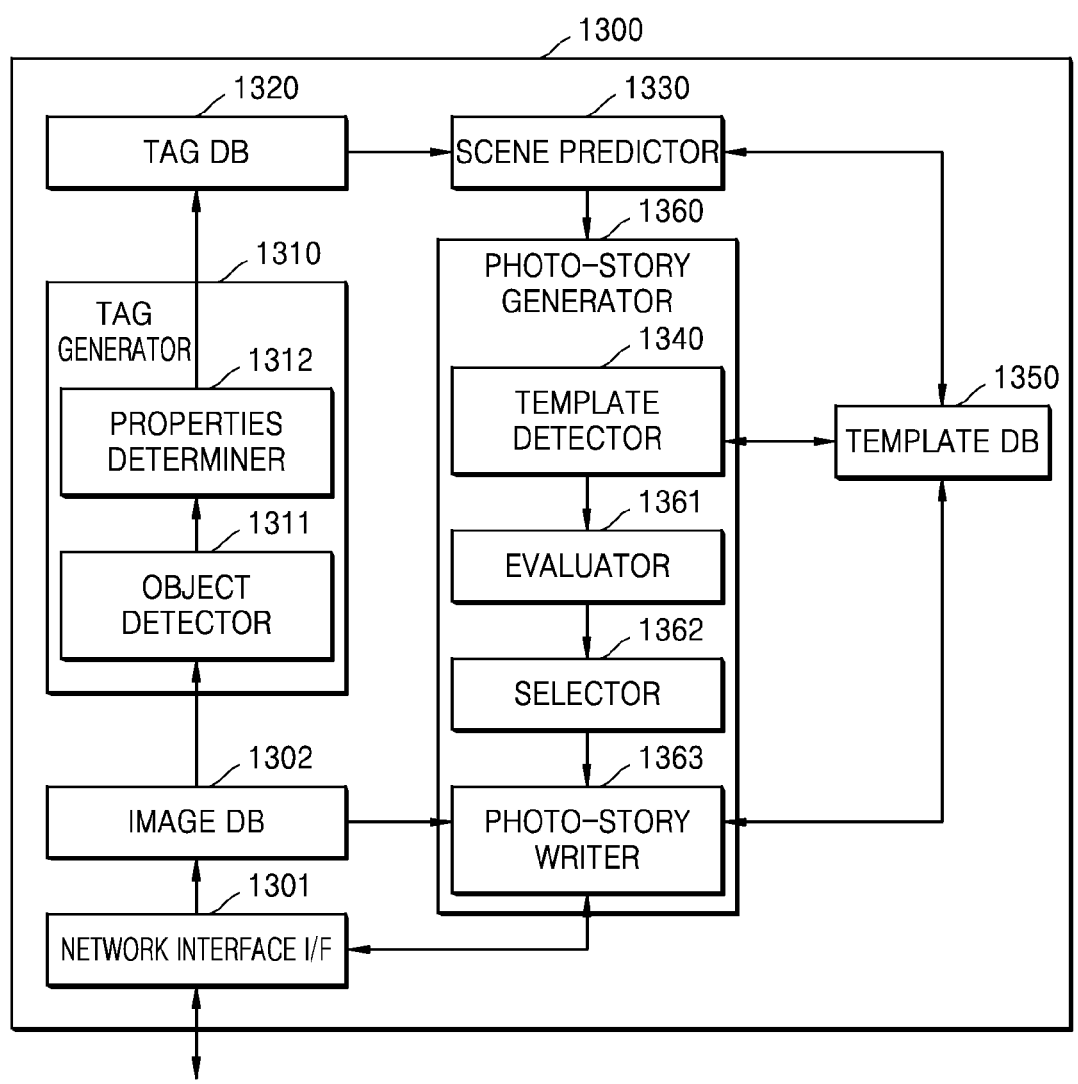
FIG. 13 is a block diagram of an apparatus for generating a photo-story, according to an exemplary embodiment.

FIG. 13 is a block diagram of an apparatus 1300 for generating a photo-story, according to an exemplary embodiment.

As shown in FIG. 13, the apparatus 1300 may include a network interface (I/F) 1301, an image database (DB) 1302, a tag generator 1310, a tag database (DB) 1320, a scene predictor 1330, a template detector 1340, a template database (DB) 1350, and a photo-story generator 1360.

The network interface 1301 may receive input photo images from an external source, for example, a user terminal, a multimedia content sharing service server, and an SNS server, and may transmit a photo-story file to the user terminal. Any communication protocol may be used. Although the apparatus 1300 and the user terminal reproducing a photo-story are assumed as separate devices, a system for generating and reproducing the photo-story may be implemented in a single device.

The image DB 1302 stores photo images that are input to generate the photo-story.

The tag generator 1310 includes an object detector 1311 and a properties determiner 1312, analyzes the input photo images by using the machine learning technique, and generates tags that indicate properties of context of the photo images. In particular, an object, an action, a facial expression, etc. detected on the photo images may be generated as tags. The object detector 1311 may detect the object, action, etc. on the photo images by using visual pattern recognition models that are learned via training images. During this process, not only metadata of the photo image file, but also technical information of the photo images, such as pixel information, peripheral histograms, and color histograms, may be referenced. The properties determiner 1312 may determine the properties of the context of the photo image based on the object or action detected on the photo images. For example, when a photo image with a relatively high average brightness is provided and two people, bicycles, and helmets are detected on the photo image, tags such as 'PEOPLE,' 'BICYCLES,' and 'HELMETS' may be mapped to the photo image. Furthermore, a property called 'OUTDOOR ACTIVITY' may be derived based on objects detected via the machine learning technique.

Furthermore, the properties determiner 1312 may detect identical or similar photo images and indicate the similarity of the photo images on respective tags of the images. Based on the similarity of the photo images, it is possible to prevent overlapping images from being used in a photo-story. Also, when a low quality photo image is included when generating a photo-story, the low quality photo image may be replaced with a relatively higher quality image with a context that is the same as or similar to the low quality photo image.

The tag DB 1320 may store the tags generated based on the analysis of the context of the photo images.

The scene predictor 1330 may predict a scene that is matched to the photo images, based on the tags stored in the tag DB 1320. In this case, a scene template stored in the template DB 1350 is referenced. The scene template specifies photo images of which properties are included in a scene. For example, a scene template for a scene 'LEISURE TIME AT BEACH' may specify that three or more photo images including people and beach are to be used.

Based on scenes predicted by the scene predictor 1330, the template detector 1340 may detect photo-story templates that match with the input photo images, from among photo-story templates stored in the template DB 1350.

The template DB 1350 stores the photo-story templates and the scene templates.

The photo-story template specifies scenes that configure the photo-story, and defines a storyline of the photo-story. For example, the photo-story template may not chronologically arrange selected photo images in the photo-story, but arrange the selected photo image according to a storyline based on the Aristotle 3-act structure including a setup stage, a confrontation stage, and a resolution stage.

The photo-story template is usually generated in advance. However, as described above, the photo-story template may be newly discovered via the machine learning technique during the analysis of the context of the input photo images.

The photo-story generator 1360 may generate the photo-story according to the photo-story template, and may include the template detector 1340, an evaluator 1361, a selector 1362, and a photo-story creator 1363. The evaluator 1361 may evaluate how much candidate photo-story templates detected by the template detector 1340 match with the input photo images. For example, when each of the candidate photo-story templates is configured of scenes required for respective photo-stories by using the photo images, a comprehensive matching degree between the photo images and the candidate photo-story templates is evaluated.

From among the candidate photo-story templates, the selector 1362 may select a candidate photo-story template of a photo-story which will be provided to the user, based on an evaluation result of the evaluator 1361. That is, the selector 1362 may select a best matching photo-story when generating a photo-story by using a combination of scenes that correspond to the input photo images.

The photo-story creator 1363 may generate the photo-story according to at least one photo-story template selected by the selector 1362. When an image of a scene used in the photo-story template cannot be found from the input photo images, an appropriate image may be found and downloaded from the Internet. For example, when an image of Times Square used in a photo-story template 'New York City Trip' cannot be found from the input photo images, the image of Times Square may be downloaded from the Internet and used in the photo-story.

Figure 14:
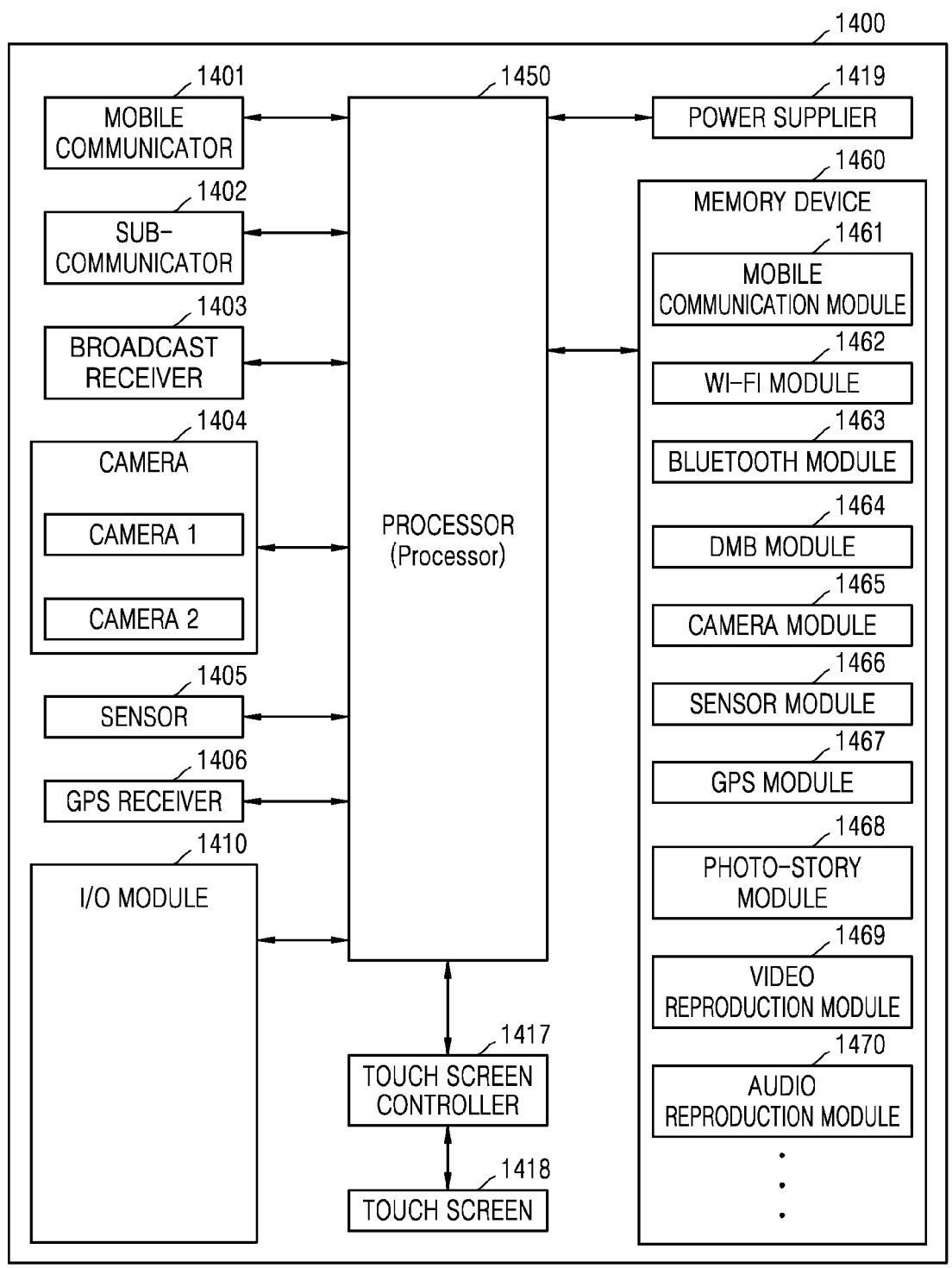
FIG. 14 is a block diagram of an apparatus for reproducing a photo-story, according to an exemplary embodiment.

FIG. 14 is a block diagram of a user terminal 1400 for reproducing a photo-story, according to an exemplary embodiment.

Although FIGS. 13 and 14 illustrate that the apparatus 1300 of FIG. 13 and the user terminal 1400 of FIG. 14 are separate devices, as described above, the apparatus 1300 may be provided in the user terminal 1400. According to an exemplary embodiment, the user terminal 1400 may include, but is not limited to, a smartphone, a tablet computer, or a PC. Also, the user terminal 1400 is not limited to a mobile device.

A mobile communicator 1401 may perform call setup, data communication, etc. with a base station via a mobile communication network such as a 3G/4G network. A sub-communicator 1402 may perform a process for short distance communication, such as Bluetooth or Near Field Communication (NFC). A broadcast receiver 1403 may receive Digital Multimedia Broadcasting (DMB) signals.

A camera 1404 may include a lens and optical devices for capturing images or videos. Although FIG. 14 illustrates two cameras, only one camera, or three or more cameras may be included according to exemplary embodiments.

A sensor 1405 may include a gravity sensor detecting motions of the user terminal 1400, a brightness sensor detecting brightness of light, a proximity sensor detecting proximity of a person, and a motion sensor detecting motions of a person.

A Global Positioning System (GPS) receiver 1406 may receive GPS signals from a satellite. Various services may be provided to the user by using the GPS signals.

An input/output (I/O) module 1410 may provide an interface between the user terminal 1400 and an external device or a person. Although not illustrated, the I/O module 1410 may include a button, a microphone, a vibration motor, a connector, a keypad, etc.

A touch screen 1418 may receive a touch input of the user. The touch input may be detected by various gestures, including, pinching, spreading, dragging, tapping, etc. A touch screen controller 1417 may transmit the touch input received via the touch screen 1418 to a processor 1450. A power supplier 1419 may be connected to a battery or an external power source to supply power necessary for the user terminal 1400.

The processor 1450 may control components shown on FIG. 14 by executing programs stored in a memory device 1460, and perform various functions of the user terminal 1400.

The programs stored in the memory device 1460 may be classified as a plurality of modules according to their functions, for example, a mobile communication module 1461, a Wi-Fi module 1462, a Bluetooth module 1463, a DMB module 1464, a camera module 1465, a sensor module 1466, a GPS module 1467, a photo-story module 1468, a video reproduction module 1469, an audio reproduction module 1470, and the like.

Each of the modules may include commands for performing corresponding functions. Since one of ordinary skill in the art may understand the corresponding functions of the modules from respective names of the modules, and only the photo-story module 1468 for processing a photo-story according to the exemplary embodiments will be described herein.

The photo-story module 1468 may display a list of photo-stories generated based on tags of input photo images, and reproduce a photo-story selected by a user input from the list.

The list of photo-stories hierarchically displays identifiers (e.g., titles) of the photo-stories, and the identifiers in the list may display photo images in respective photo-stories.

The exemplary embodiments in the present disclosure have been described with reference to different functional modules and processors for clarity. However, it will be apparent that any suitable distribution of functionality between different functional modules or processors may be used without detracting from the present disclosure. For example, functionality illustrated to be performed by independent modules may be performed by a single modules, and according to exemplary embodiments, functionality of the modules is mutually exchangeable. Accordingly, references to specific functional modules are to be regarded as references to suitable modules for providing the described functionality rather than indicative of a strict logical or physical structure or organization.

The various exemplary embodiments of the present disclosure may be implemented in any suitable form, including hardware, software, firmware, or any combination thereof. Although the present disclosure is described with some exemplary embodiments, the inventive concept is not limited to a specific exemplary embodiments described herein.

The methods and/or modules may be implemented as computer-readable code that is stored in a non-transitory computer-readable storage medium and executed by a hardware processor or computer. The non-transitory computer-readable storage medium may be any kind of recording device which stores computer-readable data. Examples of the non-transitory computer-readable storage medium include ROMs, RAMs, CD-ROMs, magnetic tapes, floppy disks, hard disks, optical recording media, and transmission media such as Internet transmission media. The non-transitory computer-readable storage medium may also be a distributed network, and the computer-readable code may be stored and executed in a distributed fashion.

The scope of the present disclosure is defined by the following claims. Although features of the present disclosure are described with reference to only some exemplary embodiments, various combinations of the above-described exemplary embodiments will be apparent to one of ordinary skill in the art. In the claims, the terms "comprises" and/or "comprising" do not exclude the presence of other components or operations.

Furthermore, various modules, components, and operations described herein may be implemented in a single modules or a processor. Also, although individual features may be included in different claims, the features may be combined, and the inclusion in different claims does not imply that a combination of features is not possible. Also, the inclusion of a feature in one category of claims does not imply a limitation to this category, but rather indicates that the feature is equally and appropriately applicable to other claim categories.

What is claimed is:

1. A method of automatically generating a photo-story without intervention of a user, the method comprising:
    generating tags that indicate properties of a context of each of a plurality of photo images;
    predicting, based on the generated tags, scenes indicated by the photo images;
    selecting at least one photo-story template that matches with the predicted scenes, from among a plurality of photo-story templates, each photo-story template specifying scenes that configure the photo-story and define a storyline of the photo-story; and
    generating at least one photo-story by selecting, based on the at least one photo-story template, at least one photo image from among the plurality of photo images, the selected at least one photo image corresponding to the scenes of the at least one photo-story template, and arranging, based on the at least one photo-story template, the selected at least one photo image in a predetermined order; and
    detecting, from among the plurality of photo images, identical or similar photo images according to a criterion,
    wherein the generating the at least one photo-story comprises, when the identical or similar photo images are commonly used in at least two different photo-stories, linking the identical or similar photo images used in the at least two different photo-stories to each other to function as an intersection point between the at least two different photo-stories, and
    wherein the storyline of the photo-story is based on a structure including at least one stage.

2. The method of claim 1, wherein the generating the tags comprises:
    detecting objects in the photo images by using visual pattern recognition models that are learned from training images; and
    determining, based on the detected objects, the properties of the context of each of the plurality of photo images.

3. The method of claim 1, wherein the generating the at least one photo-story comprises:
    detecting candidate templates that comprise the predicted scenes, from among a plurality of templates that define a structure of the at least one photo-story;
    evaluating a matching degree between each of the candidate templates and photo images in the predicted scenes;
    selecting, based on a result of the evaluating, at least one of the candidate templates as a final template; and
    generating, based on the selected final template, the at least one photo-story to be provided to the user.

4. The method of claim 3, wherein the plurality of templates are preset or automatically generated by using the plurality of photo images and unsupervised machine learning.

5. The method of claim 1,
    wherein the generating the at least one photo-story comprises selecting, when the detected overlapping images correspond to an identical photo-story, one of the overlapping images as an image to be used in the identical photo-story.

6. The method of claim 3, wherein the generating the at least one photo-story comprises downloading at least one image used in a scene of the final template from the Internet.

7. The method of claim 1, further comprising collecting the plurality of photo images from at least one of a user terminal, a multimedia content sharing service server, and a social network service server.

8. An apparatus for automatically generating a photo-story without intervention of a user, the apparatus comprising:
> a tag generator configured to generate tags that indicate properties of a context of each of a plurality of photo images;
> a scene predictor configured to predict, based on the generated tags, scenes indicated by the photo images; and
> a photo-story generator configured to select at least one photo-story template that matches with the predicted scenes, from among a plurality of photo-story templates, each photo-story template specifying scenes that configure the photo-story and define a storyline of the photo-story, and generate at least one photo-story by selecting, based on the at least one photo-story template, at least one photo image from among the plurality of photo images, the selected at least one photo image corresponding to the scenes of the at least one photo-story template, and arranging, based on the at least one photo-story template, the selected at least one photo image in a predetermined order, and to detect, from among the plurality of photo images, identical or similar photo images according to a criterion,
> wherein the photo-story generator generates the at least one photo-story by, when the identical or similar photo images are commonly used in at least two different photo-stories, linking the identical or similar photo images used in the at least two different photo-stories to each other to function as an intersection point between the at least two different photo-stories, and
> wherein the storyline of the photo-story is based on a structure including at least one stage.

9. The apparatus of claim 8, wherein the tag generator comprises:
> an object detector configured to detect objects in the photo images by using visual pattern recognition models that are learned from training images; and
> a properties determiner configured to determine, based on the detected objects, the properties of the context of each of the plurality of photo images.

10. The apparatus of claim 8, wherein the photo-story generator comprises:
> a template detector configured to detect candidate templates that comprise the predicted scenes, from among a plurality of templates that define a structure of the at least one photo-story;
> an evaluator configured to evaluate a matching degree between the candidate templates and photo images in the predicted scenes;
> a selector configured to select, based on a result of the evaluation, at least one of the candidate templates as a final template; and
> a photo-story creator configured to create, based on the selected final template, the at least one photo-story to be provided to the user.

11. The apparatus of claim 10, wherein the plurality of templates are preset or automatically generated by using the plurality of photo images and unsupervised machine learning.

12. The apparatus of claim 8,
> wherein the photo-story generator selects, when the overlapping images correspond to an identical photo-story, one of the overlapping images as an image to be used in the identical photo-story.

13. The apparatus of claim 10, wherein the photo-story creator downloads at least one image used in a scene of the final template from the Internet.

14. The apparatus of claim 8, further comprising a network interface configured to receive the plurality of photo images from at least one of a user terminal, a multimedia content sharing service server, and a social network service server.

15. A method of displaying a photo-story on a user terminal, the method comprising:
> displaying a list of photo-stories generated based on tags that indicate properties of a context of a plurality of photo images, and for each photo-story, displaying the tags that indicate the properties of the context of the photo images included in the photo-story; and
> reproducing a photo-story that is selected from the list according to a user input,
> wherein the photo-story is generated by selecting, based on at least one photo-story template, at least one photo image from among the plurality of photo images, each photo-story template specifying scenes that configure a photo-story and define a storyline of the photo-story and the selected at least one photo image corresponding to scenes of the at least one photo-story template, and arranging, based on the at least one photo-story template, the selected at least one photo image in a predetermined order,
> wherein the method further comprises detecting, from among the plurality of photo images, identical or similar photo images according to a criterion and, when the identical or similar photo images are commonly used in at least two different photo-stories, linking the identical or similar photo images used in the at least two different photo-stories to each other to function as an intersection point between the at least two different photo-stories, and
> wherein the storyline of the photo-story is based on a structure including at least one stage.

16. The method of claim 15, wherein the displaying of the list comprises displaying respective titles of the photo-stories together with the tags that indicate the properties of photo images included in each of corresponding photo-stories.

17. The method of claim 15, wherein the displaying the list comprises displaying the respective titles hierarchically.

18. The method of claim 15, further comprising displaying preferred tags, which are tags that are detected with a frequency higher than a threshold frequency from among the tags of the photo images,
> wherein the displaying of the list comprises displaying a list of photo-stories that comprise at least one photo image that is mapped to at least one tag selected from the displayed preferred tags according to a user input.

19. The method of claim 15, wherein the reproducing comprises displaying only photo images that are mapped to a tag selected, by a user, from photo images of the selected photo-story.

20. The method of claim 15, wherein the reproducing comprises providing, while a photo image that is included in the selected photo-story and another photo-story is displayed, a user interface for jumping to the other photo-story.

21. A user terminal comprising:
> at least one memory device configured to store at least one program for displaying a photo-story; and at least one processor configured to execute the at least one program stored in the at least one memory device, wherein the at least one program comprises instructions for performing a method comprising:

displaying a list of photo-stories generated based on tags that indicate properties of a context of a plurality of photo images, and for each photo-story, displaying the tags that indicate the properties of the context of the photo images included in the photo-story; and reproducing a photo-story that is selected from the list according to a user input, wherein the photo-story is generated by selecting, based on at least one photo-story template, at least one photo image from among the plurality of photo images, each photo-story template specifying scenes that configure a photo-story and define a storyline of the photo-story and the selected at least one photo image corresponding to scenes of the at least one photo-story template, and arranging, based on the at least one photo-story template, the selected at least one photo image in a predetermined order, wherein the method further comprises detecting, from among the plurality of photo images, identical or similar images according to a criterion and, when the identical or similar photo images are commonly used in at least two different photo-stories, linking the identical or similar photo images used in the at least two different photo-stories to each other to function as an intersection point between the at least two different photo-stories, and wherein the storyline of the photo-story is based on a structure including at least one stage.

22. The user terminal of claim 21, wherein the displaying the list comprises displaying respective titles of the photo-stories together with the tags that indicate the properties of photo images included in each of corresponding photo-stories.

23. The user terminal of claim 21, wherein the displaying the list comprises displaying the respective titles hierarchically.

24. The user terminal of claim 21, wherein the method further comprises displaying preferred tags, which are tags that are detected with a frequency higher than a threshold frequency from among the tags of the photo images, and wherein the displaying the list comprises displaying a list of photo-stories that comprise at least one photo image that is mapped to at least one tag selected from the displayed preferred tags according to a user input.

25. The user terminal of claim 21, wherein the reproducing comprises displaying only photo images that are mapped to a tag selected, by a user, from photo images of the selected photo-story.

26. The user terminal of claim 21, wherein the reproducing comprises providing, while a photo image that is included in the selected photo-story and another photo-story is displayed, a user interface for jumping to the other photo-story.

27. A non-transitory computer-readable recording medium having recorded thereon a program, which, when executed by a computer, performs the method of claim 1.

* * * * *